(12) United States Patent
Yamada

(10) Patent No.: US 9,707,923 B2
(45) Date of Patent: Jul. 18, 2017

(54) AIRBAG DEVICE FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 15/071,412

(22) Filed: Mar. 16, 2016

(65) Prior Publication Data

US 2016/0280176 A1     Sep. 29, 2016

(30) Foreign Application Priority Data

Mar. 26, 2015  (JP) .................................. 2015-65125

(51) Int. Cl.
*B60R 21/2338*  (2011.01)
*B60R 21/205*   (2011.01)
*B60R 21/233*   (2006.01)
*B60R 21/239*   (2006.01)

(52) U.S. Cl.
CPC ........ *B60R 21/2338* (2013.01); *B60R 21/205* (2013.01); *B60R 21/233* (2013.01); *B60R 21/239* (2013.01); *B60R 2021/2395* (2013.01); *B60R 2021/23308* (2013.01); *B60R 2021/23316* (2013.01); *B60R 2021/23324* (2013.01); *B60R 2021/23382* (2013.01)

(58) Field of Classification Search
CPC . B60R 21/231; B60R 21/2338; B60R 21/205; B60R 2021/23382; B60R 2021/0032
See application file for complete search history.

(56) References Cited

U.S. PATENT DOCUMENTS

| 7,131,664 B1* | 11/2006 | Pang ..................... B60R 21/233 |
| | | 280/743.2 |
| 7,992,897 B2* | 8/2011 | Sekino .................. B60R 21/231 |
| | | 280/729 |
| 8,657,334 B2* | 2/2014 | Mallinger ............. B60R 21/231 |
| | | 280/743.1 |

(Continued)

FOREIGN PATENT DOCUMENTS

| JP | 2002-104118 A | 4/2002 |
| JP | 2002-104119 A | 4/2002 |

(Continued)

*Primary Examiner* — Drew J Brown
(74) *Attorney, Agent, or Firm* — Posz Law Group, PLC

(57) ABSTRACT

An airbag of an airbag device for a front passenger seat includes a passenger-side wall, a circumferential wall, a gas inlet port disposed in a vicinity of the front end of the airbag as deployed, a bottom pocket that is recessed upward from a lower region of the circumferential wall in such a manner as to be continuous with the lower region, and a tether that is disposed generally along a front and rear direction inside the airbag and connects the passenger-side wall and a vicinity of the gas inlet port. The bottom pocket is formed into a pouch like contour by joining outer circumferential edges of left and right bottom pocket constituent regions that extend from the lower region of the circumferential wall. The upper end region of the bottom pocket is joined to the tether.

20 Claims, 14 Drawing Sheets

(56) References Cited

U.S. PATENT DOCUMENTS

| | | | |
|---|---|---|---|
| 8,807,596 B1 * | 8/2014 | Co | B60R 21/2338 280/743.2 |
| 8,864,170 B2 * | 10/2014 | Yamada | B60R 21/2338 280/732 |
| 2002/0063416 A1 * | 5/2002 | Kamaiji | B60R 21/231 280/728.2 |
| 2008/0246261 A1 | 10/2008 | Webber et al. | |
| 2009/0250912 A1 * | 10/2009 | Libby | B60R 21/233 280/730.1 |
| 2010/0225095 A1 * | 9/2010 | Smith | B60R 21/2338 280/729 |
| 2011/0062693 A1 | 3/2011 | Williams | |

FOREIGN PATENT DOCUMENTS

| | | |
|---|---|---|
| JP | 2002-104120 A | 4/2002 |
| JP | 2003-137052 A | 5/2003 |
| JP | 2007-296979 A | 11/2007 |
| JP | 2010-523398 A | 7/2010 |
| JP | 2010-241296 A | 10/2010 |
| JP | 2011-031656 A | 2/2011 |
| JP | 2011-213196 A | 10/2011 |
| JP | 2013-505166 A | 2/2013 |
| WO | 2010/122835 A1 | 10/2010 |

* cited by examiner

AIRBAG DEVICE FOR A FRONT PASSENGER SEAT

CROSS REFERENCE TO RELATED APPLICATIONS

The present application claims priority from Japanese Patent Application No. 2015-065125 of Yamada, filed on Mar. 26, 2015, the entire disclosure of which is incorporated herein by reference.

BACKGROUND OF THE INVENTION

1. Field Of The Invention

The present invention relates to an airbag device for a front passenger seat which is adapted to be mounted on a top plane of an instrument panel of a vehicle in front of the front passenger seat and includes an airbag which is housed in a housing in a folded-up configuration and is deployable when fed with an inflation gas.

2. Description Of Related Art

JP 2010-241296A discloses a known airbag device for a front passenger seat whose airbag is provided, on the lower wall as deployed, with a bottom pocket which is continuous with the lower wall and recessed upward. The bottom pocket is provided for reducing a pressing force against an out-of-position passenger seated in proximity to the instrument panel of the vehicle. By way of example, the bottom pocket is expected to receive the head of such an out-of-position, especially small-sized, passenger and thus give a reduced pressing force to the head.

The bottom pocket of the known airbag device is formed into a generally triangle enlarging downwardly and is configured to keep recessed at full deployment of the airbag by being joined (sewn) to a passenger-side wall of the airbag by the rear edge. However, because the rear edge of the bottom pocket is entirely and directly joined to the passenger-side wall, the region in a vicinity of the rear edge of the bottom pocket does not bend easily, which may cause a failure in smooth reception of the head of an out-of-position passenger. Further, when the airbag of the known airbag device is deployed to cushion a passenger seated at a normal position (i.e., an in-position passenger) in the event of a frontal collision, if the passenger bumps the passenger-side wall and presses the passenger-side wall forward, the bottom pocket can open inadvertently because the bottom pocket is directly joined to the passenger-side wall. This may cause a problem that the airbag cannot secure a sufficient internal pressure and reaction force required to protect the passenger.

SUMMARY OF THE INVENTION

The object of the present invention is to provide an airbag device for a front passenger seat whose airbag is capable of protecting a passenger seated at a normal position in an adequate fashion and does not give an undue pressure to an out-of-position passenger seated in proximity to the instrument panel.

The object of the invention will be achieved by the following airbag device for a front passenger seat. The airbag device for a front passenger seat of the invention is adapted to be mounted on an instrument panel disposed in front of the front passenger seat of a vehicle. The airbag device includes a housing adapted to be disposed on a top plane of the instrument panel and an airbag which is housed in the housing in a folded-up configuration and inflatable with an inflation gas. The airbag includes:

a passenger-side wall deployable generally vertically at a rear region of the airbag in such a manner as to face the front passenger seat;

a circumferential wall configured to extend forward from a peripheral edge of the passenger-side wall in a tapering fashion, the circumferential wall including a lower wall that is deployable on a lower region of the circumferential wall;

a gas inlet port disposed generally at a center in a left and right direction in a vicinity of a front end of the airbag as deployed for taking in the inflation gas;

a bottom pocket that is recessed upward from the lower wall of the circumferential wall in a pouch-like fashion in such a manner as to be continuous with the lower wall and have an opening at the lower end on the lower wall, the bottom pocket being formed by joining outer circumferential edges of a pair of bottom pocket constituent regions that extend from the lower wall at left and right peripheries of the opening of the bottom pocket; and a tether that is disposed generally along a front and rear direction inside the airbag, the tether connecting the passenger-side wall and a vicinity of the gas inlet port for preventing the passenger-side wall from protruding rearward at airbag deployment, the tether being connected to an upper end region, i.e., a bottom region, of the bottom pocket.

With this configuration, while being joined to the tether by the upper end region, the bottom pocket is deployable in front of and away from the passenger-side wall. When the airbag of the airbag device of the invention is deployed in an instance where a small-sized passenger is seated close to the instrument panel, the front and rear edges of the bottom pocket will be allowed to bend smoothly, and the bottom pocket will smoothly open by separating the left and right bottom pocket constituent regions over a generally entire area in a front and reaction without being affected by the passenger-side wall, and receive the out-of-position passenger therein. Accordingly, the airbag of the invention will not give a great pressure to the head of the out-of-position passenger at deployment.

Moreover, when a passenger seated at a normal position (i.e., an in-position passenger) is thrown against the passenger-side wall of the airbag of the invention and presses the passenger-side wall forward at a frontal collision of a vehicle, the bottom pocket will be hardly affected by the forward movement of the passenger-side wall and stay closed since the bottom pocket is disposed away from the passenger-side wall and pulled forward by the tether. As a consequence, the airbag of the airbag device of the invention will smoothly cushion the in-position passenger with regions of the passenger-side wall on the left and right sides of the tether, and cushion the passenger with the passenger-side wall having a sufficient reaction force since the bottom pocket is not deformed as described above.

Therefore, with the airbag device for a front passenger seat of the invention, the airbag is capable of protecting the passenger seated at a normal position in an adequate fashion and does not give an undue pressure to the out-of-position passenger located in proximity to the instrument panel.

Moreover, in the airbag device of the invention, the airbag includes the tether that connects the passenger-side wall and a vicinity of the gas inlet port inside the airbag for preventing the passenger-side wall from protruding rearward at airbag deployment. At airbag deployment, the tether will prevent the airbag from oscillating in a front and rear direction as well as prevent the passenger-side wall from protruding unduly rearward, thus help deploy the airbag quickly.

The airbag device for a front passenger seat of the invention desirably includes, in addition to the bottom pocket, a rear pocket that is recessed forward from the passenger-side wall in a pouch-like fashion in such a manner as to continue from the passenger-side wall and have an opening at the rear end on the passenger-side wall. The rear pocket is formed by joining outer circumferential edges of a pair of rear pocket constituent regions that extend from the passenger-side wall at left and right peripheries of the opening of the rear pocket. The front end region, i.e., the bottom region, of the rear pocket is connected to the tether.

The rear pocket is capable of receiving therein a head of such a small-sized out-of-position passenger that is in contact with the instrument panel by the abdomen, by way of example, by separating the left and right rear pocket constituent regions at airbag deployment. That is, the rear pocket will help reduce a pressing force given to the head of such an out-of-position passenger.

Moreover, the airbag device of the invention further desirably includes an upper pocket that is disposed on an upper wall of the circumferential wall which is deployable on an upper side of the circumferential wall. The upper pocket is recessed downward from the upper wall in a pouch-like fashion in such a manner as to be continuous with the upper wall and have an opening at the upper end on the upper wall. The upper pocket is formed by joining outer circumferential edges of a pair of upper pocket constituent regions that extend from the upper wall at left and right peripheries of the opening of the upper pocket. The lower end region, i.e., the bottom region, of the upper pocket is connected to the tether.

The upper pocket is capable of receiving therein a head of such a small-sized out-of-position passenger that is in contact with the instrument panel by the abdomen, by way of example, by separating the left and right upper pocket constituent regions at airbag deployment. That is, the upper pocket will help reduce a pressing force given to the head of such an out-of-position passenger.

In the airbag device for a front passenger seat of the invention, it is desired that the lower wall of the airbag is composed of a pair of lower panel sections each of which is configured to form a left or right half region of the lower wall, and that each of the bottom pocket constituent regions extends from each of the lower panel sections.

With this configuration, the bottom pocket continuing from the lower wall will be formed easily by joining the circumferential edges of the bottom pocket constituent regions during a production process of the airbag.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
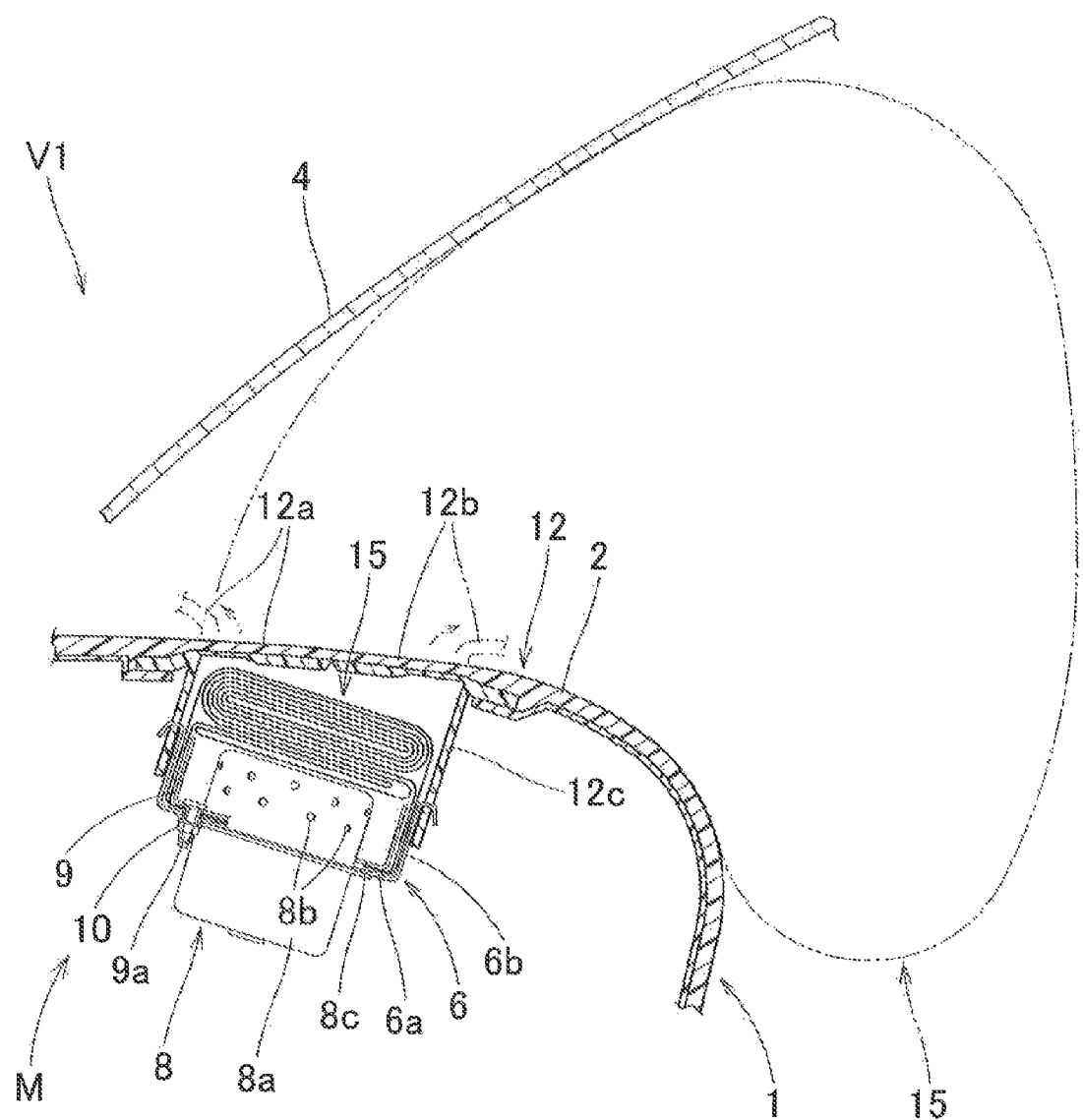
FIG. 1 is a sectional view of an airbag device for a front passenger seat embodying the invention taken along a front and rear direction of a vehicle.

As shown in FIG. 1, an airbag device M for a front passenger seat embodying the invention is a so-called top-mount airbag device mountable inside a top plane 2 of an instrument panel or dashboard 1 of a vehicle V1. The vehicle V1 on which the airbag device M is mounted is such a model with a windshield 4 mounted with a small inclination angle from a horizontal direction and thus a distance between the top plane 2 of the dashboard 1 and windshield 4 is relatively small.

As shown in FIG. 1, the airbag device M includes an airbag 15 in a folded-up configuration, an inflator 8 for supplying the airbag 15 with an inflation gas, a case or housing 6 for housing and holding the airbag 15 and inflator 8, a retainer 9 used to mount the airbag 15 and inflator 8 on the case 6 and an airbag cover 12 for covering the airbag 15 from above.

Unless otherwise specified, up/down, front/rear and left/right directions in this specification are intended to refer to up/down, front/rear and left/right directions of the vehicle V1.

The airbag cover 12 is fabricated of synthetic resin in an integral fashion with the dashboard 1. The airbag cover 12 includes two doors 12a and 12b adapted to open forward and rearward when pushed by the airbag 15 upon airbag deployment. The airbag cover 12 further includes around the doors 12a and 12b a joint wall 12c for joint with the case 6.

The inflator 8 includes a main body 8a in the shape of a generally pot and a flange 8c used to mount the inflator 8 on the case 6. The main body 8a is provided with a plurality of gas discharge ports 8b.

The case 6 is made of sheet metal into a generally rectangular parallelepiped provided with a rectangular opening at the top, and includes a generally rectangular bottom wall 6a and a circumferential wall 6b extending upward from an outer edge of the bottom wall 6a. The inflator 8 is set in the case 6 from below the bottom wall 6a and secured to the bottom wall 6a. The circumferential wall 6b is engaged with the joint wall 12c of the airbag cover 12. The airbag 15 and inflator 8 are attached to the bottom wall 6a of the case 6 with the aid of bolts 9a of the retainer 9 stored inside the airbag 15. The bolts 9a are put through peripheral areas of later-described gas inlet port 24 of the airbag 15, the bottom wall 6a of the case 6 and the flange 8c of the inflator 8, and then fastened with nuts 10. The bottom wall 6a is provided with a bracket (not shown) to be jointed to a vehicle body structure.

The airbag 15 includes a bag body 16 inflatable with an inflation gas and tethers 38, 45 and 46 disposed inside the bag body 16 for regulating the contour of the bag body 16 as deployed.

Figure 2:
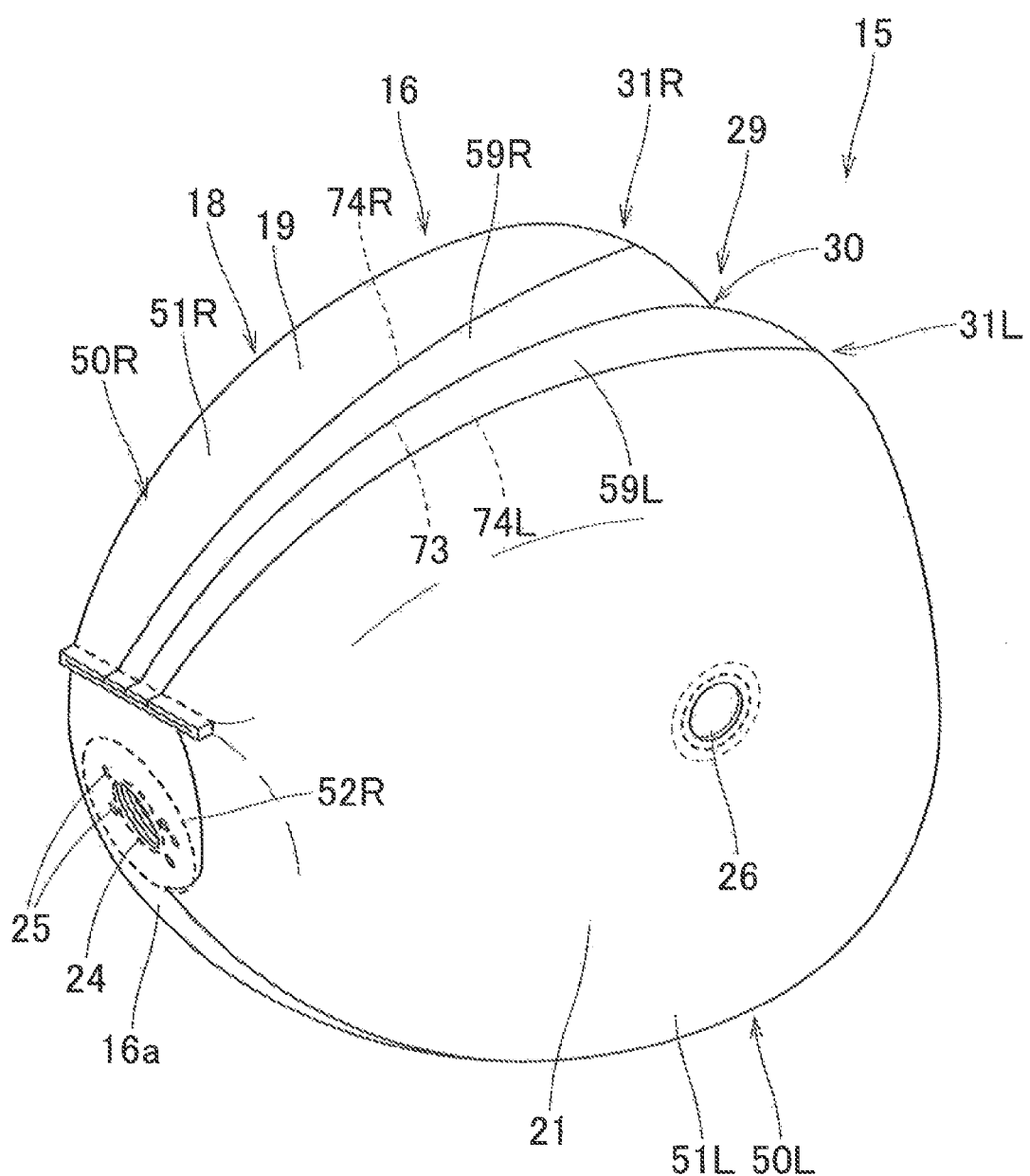
FIG. 2 is a front perspective view of an airbag for use in the airbag device of FIG. 1 as inflated by itself.
Figure 3:
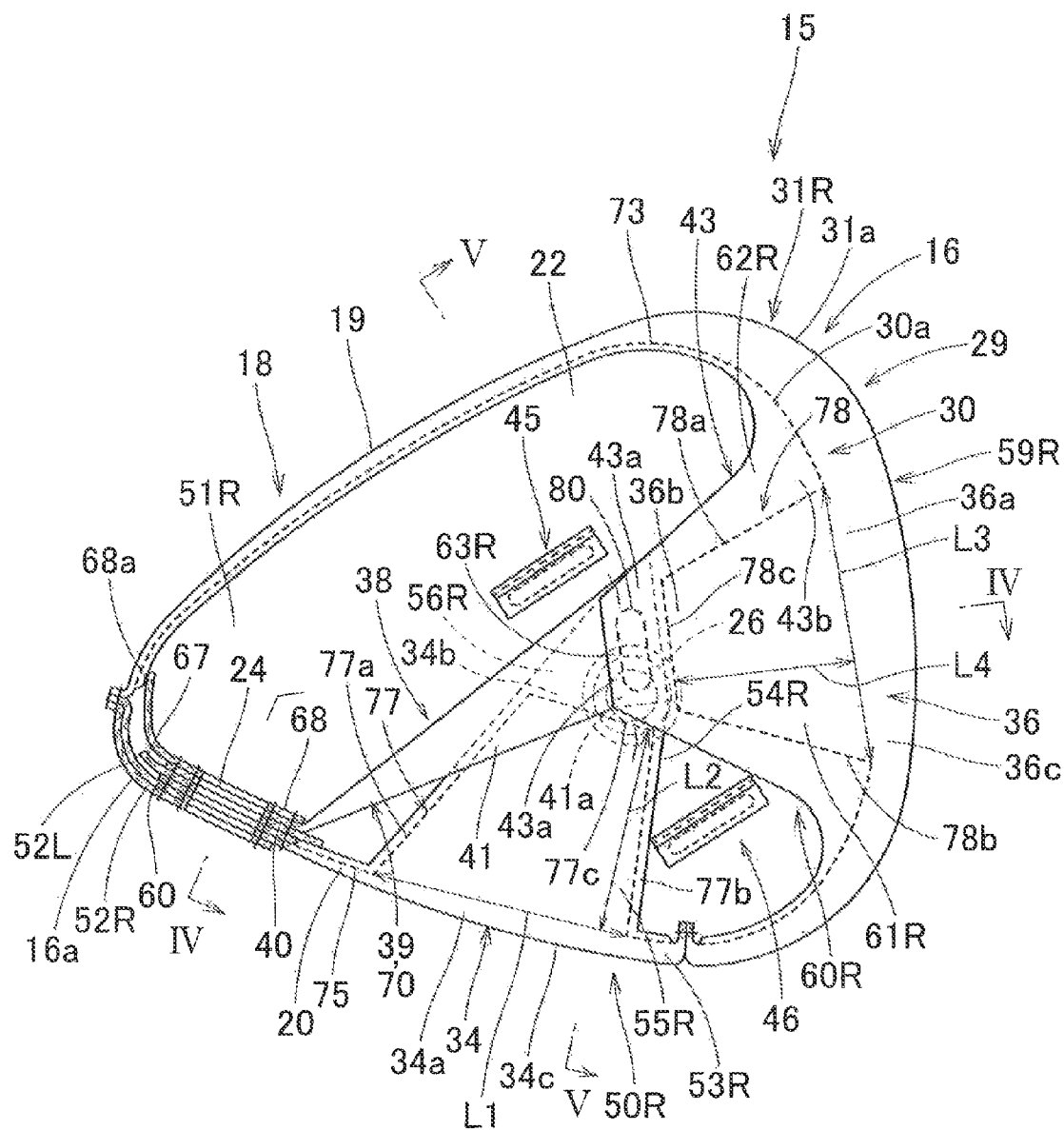
FIG. 3 is a sectional view of the airbag of FIG. 2 as inflated by itself, taken along a front and rear direction.
Figure 9:
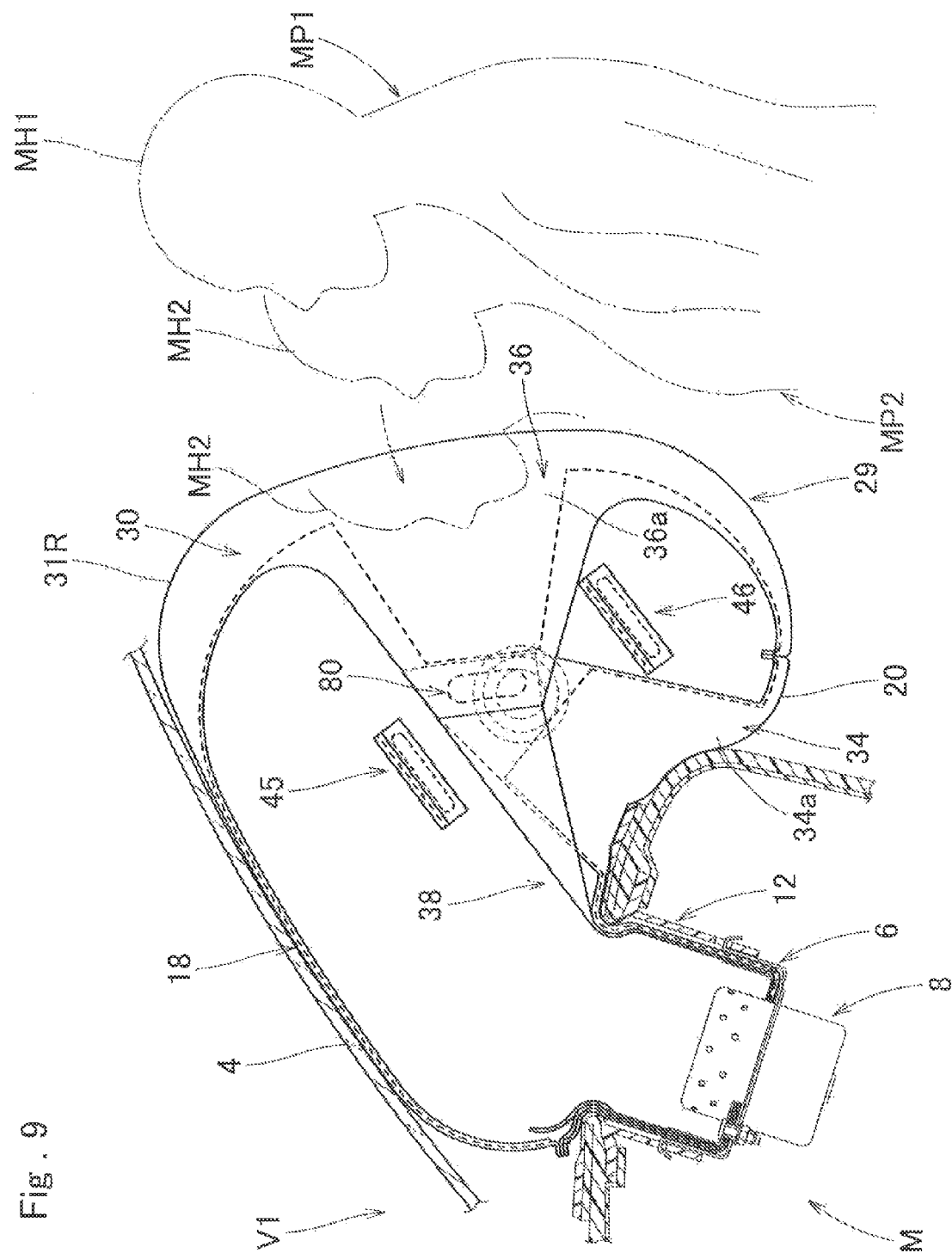
FIG. 9 is a sectional view of the airbag device taken along a front and rear direction as the airbag is fully deployed.

The bag body 16 is inflatable into such a shape as to fill up a space between the top plane 2 of the dashboard 1 and the windshield 4 at deployment, as shown in FIG. 9. More specifically, as shown in FIGS. 2 and 3, the outer contour of the bag body 16 as fully deployed is a generally square pyramid culminating at the front end 16a. The bag body 16 includes a passenger-side wall 29 deployable generally vertically at the rear to face a passenger, a circumferential wall 18 extending forward from the peripheral edge of the passenger-side wall 29 in a tapering fashion (like a generally cone), a bottom pocket 34 located on a later-described lower wall 20 of the circumferential wall 18 as deployed and a rear pocket 36 located on the passenger-side wall 29.

The circumferential wall 18 is a portion deployable mainly in such a manner as to fill up the space between the top plane 2 of the dashboard 1 and the windshield 4, and includes an upper wall 19 and a lower wall 20 deployable at the upper side and lower side, and a left side wall 21 and a right side wall 22 deployable on the left side and right side. At a vicinity of the front end of the lower wall 20 (i.e., at a vicinity of the front end 16a of the bag body 16 as deployed) is a gas inlet port 24 via which the bag body 16 takes an inflation gas in. The gas inlet port 24 is disposed generally at the center in a left and right direction of the lower wall 20, and provided, in the peripheral area, a plurality of (four, in the illustrated embodiment) mounting holes 25 for receiving the bolts 9a of the retainer 9 to mount the bag body 16 on the bottom wall 6a of the case 6. Each of the left side wall 21 and right side wall 22 includes a generally round vent hole 26 for releasing an extra inflation gas.

Figure 4:
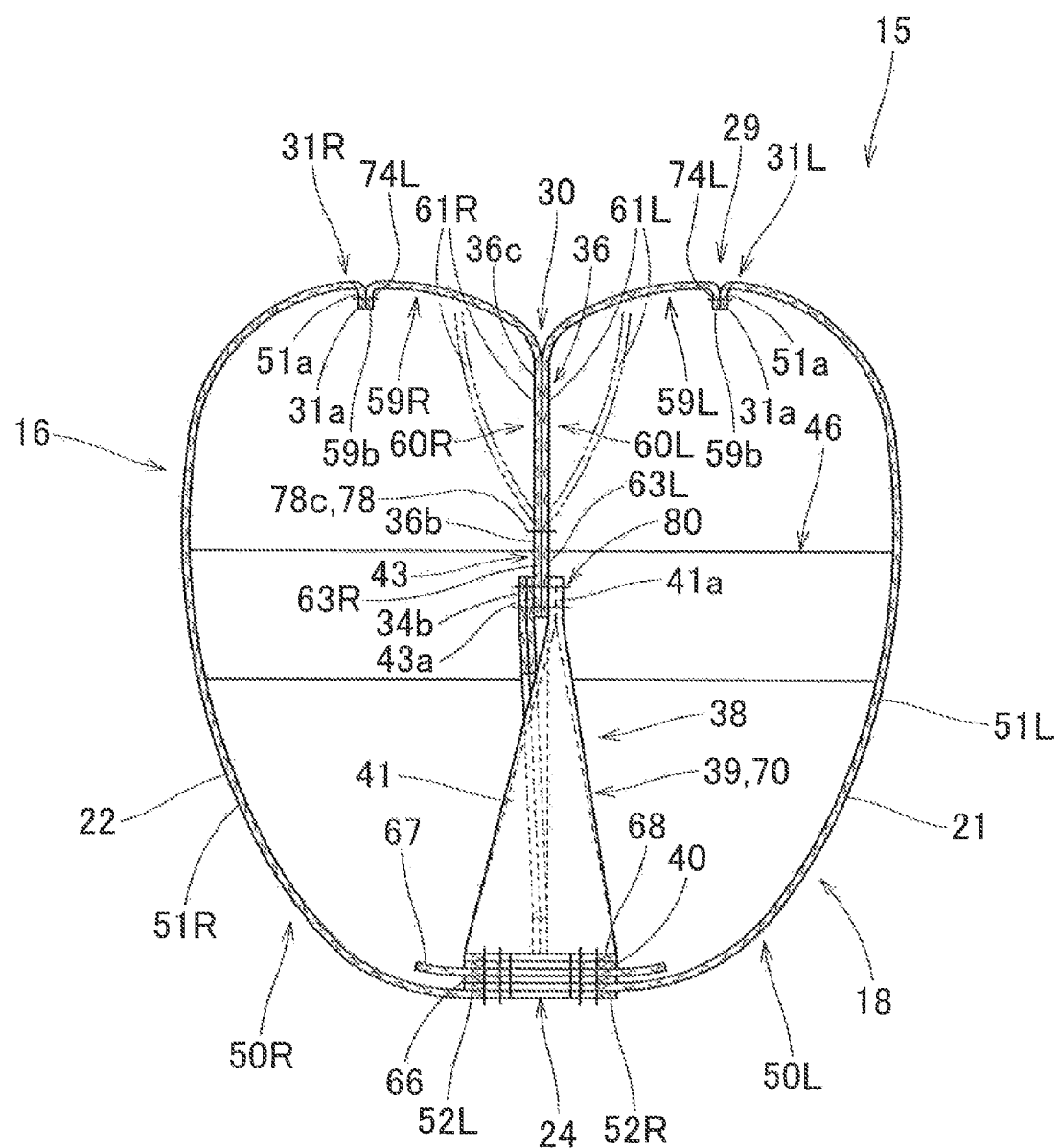
FIG. 4 is a sectional view of the airbag of FIG. 2 as inflated by itself, taken along line IV-IV of FIG. 3.

The passenger-side wall 29 is deployable generally vertically at the rear end of the bag body 16 to face a passenger MP1/MP2 seated in the front passenger seat, as shown in FIG. 9. The passenger-side wall 29 as deployed is slightly at a slant relative to an up and down direction such that the lower end is disposed farther rearward relative to the upper end, and includes a recessed region 30 which is recessed forward along an up and down direction generally at the center in a left and right direction (FIGS. 3, 4 and 9). As shown in FIG. 3, the recessed region 30 in the illustrated embodiment extends over a generally entire area in an up and down direction of the passenger-side wall 29. On the left and right sides of the recessed region 30 are a pair of raised regions 31L and 31R protruding rearward relative to the recessed region 30. That is, as shown in FIGS. 3 and 4, the recessed region 30 and raised regions 31L and 31R disposed on the left and right sides of the recessed region 30 extend continuously along an up and down direction on the passenger-side wall 29. More specifically, the unevenness created by the recessed region 30 and the raised regions 31L and 31R is generally uniform on the passenger-side wall 29, while it diminishes towards the front on the upper wall 19 and lower wall 20. In the illustrated embodiment, the bottom or front end 30a of the recessed region 30 is formed of an inner seam 73 that joins (sews) inner circumferential edges 59a of later-described inner left and right panels 59L and 59R together, while the tops 31a of the raised regions 31L and 31R are formed of outer seams 74L and 74R that join (sew) each of outer circumferential edges 51a of main bodies 51L and 51R of later-described outer left panel 50L and outer right panel 50R and each of corresponding outer circumferential edges 59b of the inner left and right panels 59L and 59R (FIGS. 3 to 5).

Figure 5:
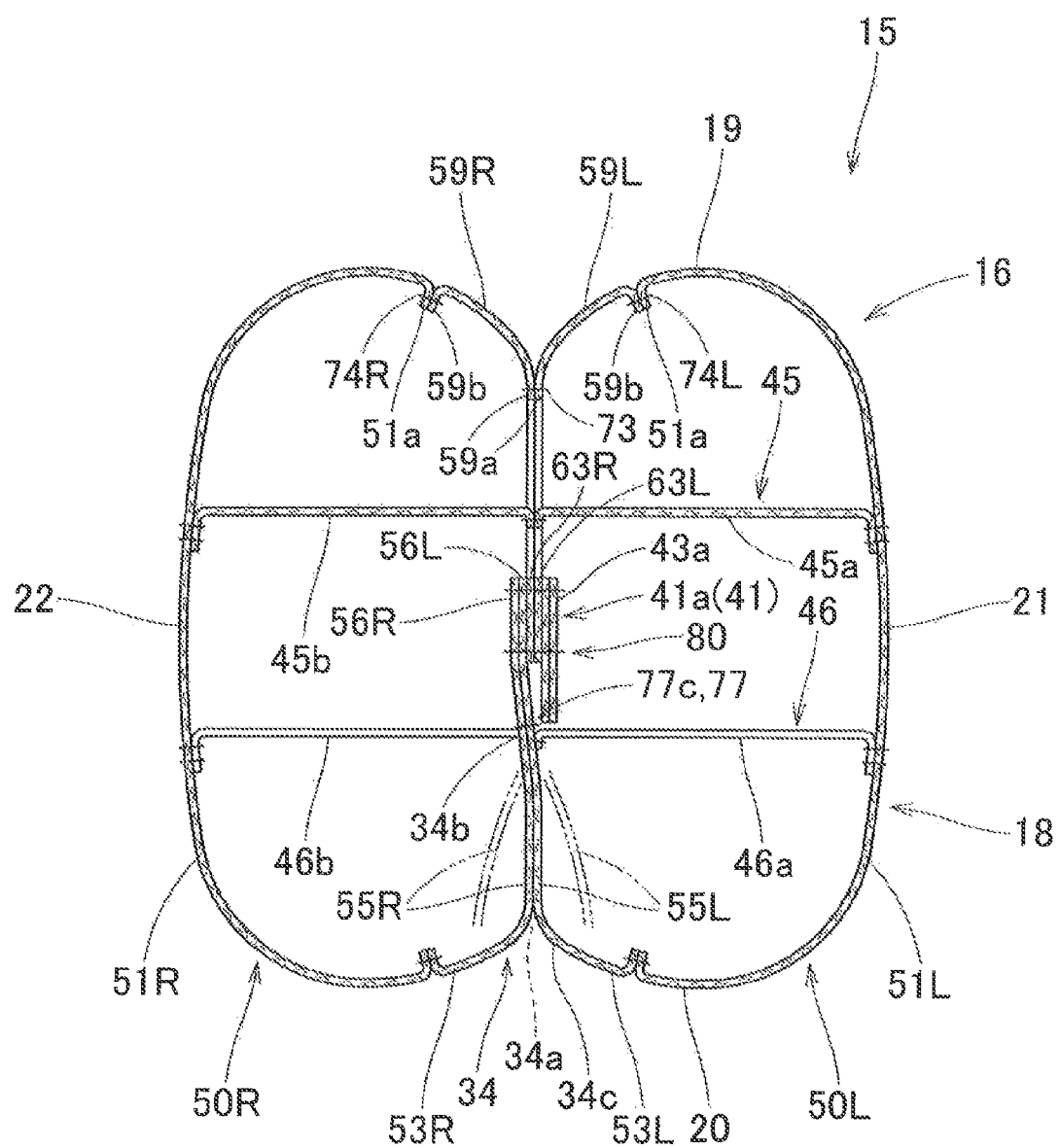
FIG. 5 is a sectional view of the airbag of FIG. 2 as inflated by itself, taken along line V-V of FIG. 3.
Figure 6:
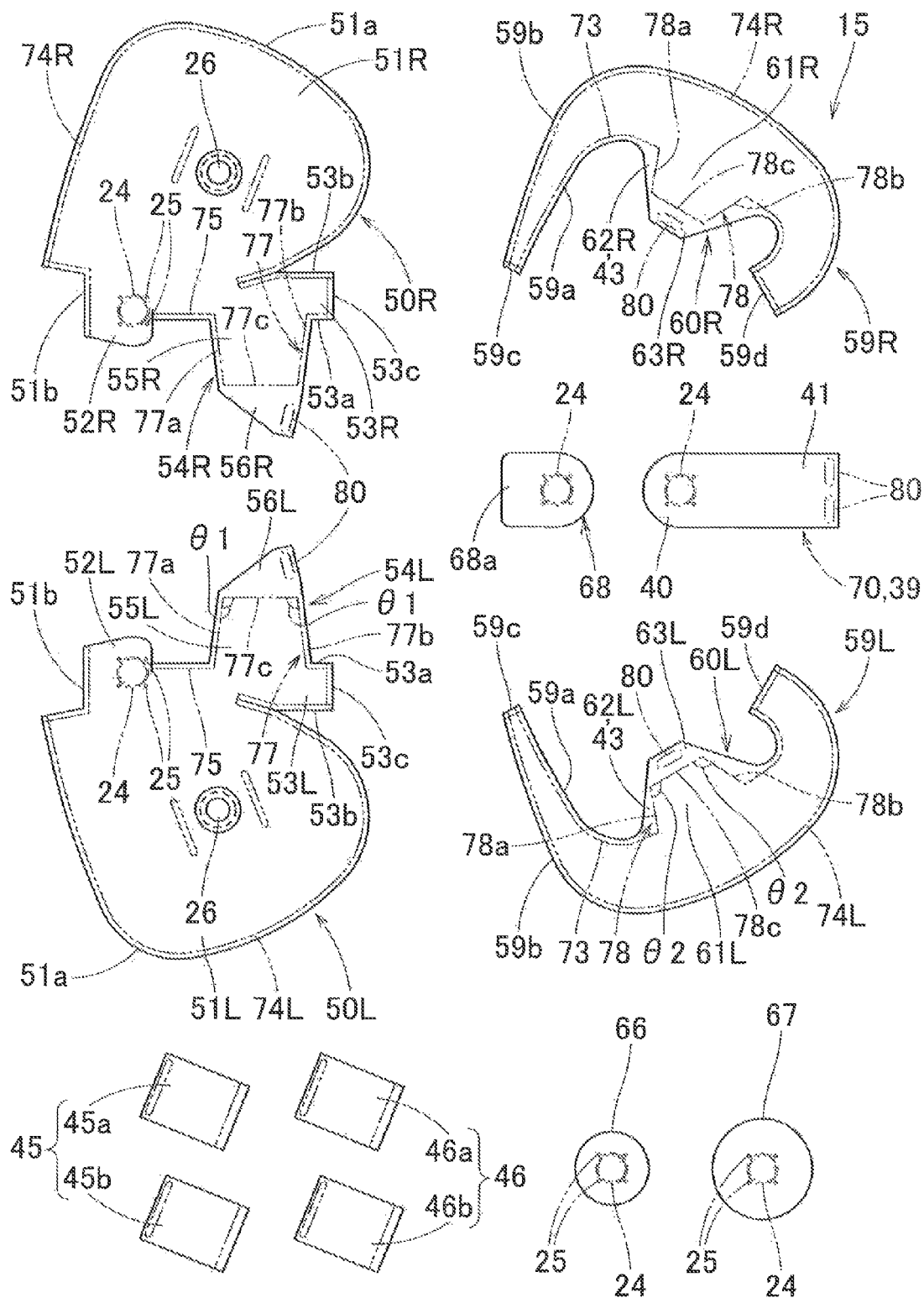
FIG. 6 depicts base cloths of the airbag of FIG. 2 by plan views.

Referring to FIGS. 3, 5 and 6, the bottom pocket 34 is continuous with the lower wall 20 and is recessed upward from the lower wall 20. Specifically, the bottom pocket 34 is composed of a pouch-like region formed by joining together outer circumferential edges of bottom pocket constituent regions 55L and 55R which extend from the lower wall 20 and are opposed in a left and right direction. The bottom pocket 34 is disposed generally along a front and rear direction at a vicinity of the rear end of the generally center in a left and right direction of the lower wall 20. More particularly, each of the bottom pocket constituent regions 55L and 55R is formed into a generally trapezoid slightly tapering towards the leading end (upper end) 34b. By joining (sewing) together the outer circumferential edges of the bottom pocket constituent regions 55L and 55R with a peripheral seam 77, the bottom pocket 34 is formed into a generally trapezoid tapering toward the upper end 34b. In the illustrated embodiment, a dimension L1 in a front and rear direction of the lower end 34c of the bottom pocket 34 (i.e., an opening width of the bottom pocket 34), see FIG. 3, and a dimension L2 in an up and down direction (i.e., depth) of the bottom pocket 34 are sized to a head of a later-described out-of-position passenger. More specifically, the opening width L1 of the bottom pocket 34 is set within a range of about 250 to 300 mm, while the depth L2 of the bottom pocket 34 is set within a range of about 150 to 200 mm. Further, the peripheral seam 77, which joins the outer circumferential edges of the bottom pocket constituent regions 55L and 55R together, is so configured that an inclination angle θ1 (FIG. 6) of a front edge 77a/rear edge 77b from an upper edge 77c is within a range of about 90° to 110°. If the inclination angle is less than 90°, the opening (or mouth) 34a of the bottom pocket 34 would be narrowed and be not enough to receive the head of the out-of-position passenger. On the other hand, the inclination angle over 110° may cause an undesirable opening of the bottom pocket 34 at normal airbag deployment. The upper end or bottom 34b of the bottom pocket 34 is connected to a later-described front-rear tether 38.

FIG. 6 depicts a pair of outer panels 50 (outer left panel 50L and outer right panel 50R) which form the circumferential wall 18 of the bag body 16. The outer left panel 50L forms the left region of the circumferential wall 18, and the outer right panel 50R forms the right region of the circumferential wall 18. In the illustrated embodiment, as shown in FIGS. 5 and 6, each of the bottom pocket constituent regions 55L and 55R is composed of an extended section 54L/54R of the outer left panel 50L/outer right panel 50R. The bottom pocket 34 is formed into a pocket by joining (sewing) together the outer circumferential edges of the pocket constituent regions 55L and 55R with the peripheral seam 77, and the peripheral seam 77 is continuous with a lower seam 75 which joins the lower edges 53a of lower sections 53L and 53R of the outer left panel 50L and outer right panel 50R, as shown in FIG. 3.

Referring to FIGS. 3 and 4, the rear pocket 36 is recessed forward in a continuous fashion with the passenger-side wall 29 on the passenger-side wall 29. Specifically, the rear pocket 36 is composed of a pouch-like region opening at the rear end 36c and is arranged generally along a front and rear direction in a continuous fashion with the recessed region 30 formed at the center in a left and right direction of the passenger-side wall 29. The rear pocket 36 is located generally at the center in an up and down direction of the passenger-side wall 29. More specifically, the rear pocket 36 is formed by joining together outer circumferential edges of rear pocket constituent regions 61L and 61R of a pair of inner panels 59 (inner left panel 59L and inner right panel 59R, see FIG. 6) for forming the passenger side-wall 29. Each of the inner left panel 59L and inner right panel 59R forms the left/right region of the passenger-side wall 29. Each of the rear pocket constituent regions 61L and 61R is a part of an extended region 60L/60R of the inner left panel 9L/inner right panel 59R, which extended regions 60L and 60R are opposed to each other in a left and right direction and form a later-described rear section 43 of the front-rear tether 38. As shown in FIG. 3, the rear pocket 36 is formed by joining the extended regions 60L and 60R with a seam 78 which is formed into a generally trapezoid open at the rear end. The seam 78 is continuous with the inner seam 73 which sews (joins) inner circumferential edges 59a of the inner left panel 59L and inner right panel 59R together. That is, in the illustrated embodiment, the rear pocket 36 is composed of a part of the front-rear tether 38, or is integrated with the front-rear tether 38, and the front end 36b of the rear pocket 36 is connected to the front-rear tether 38.

More specifically, the rear pocket 36 is formed into a generally trapezoid tapering slightly towards the leading end (front end) 36b by joining a part of the extended regions 60L and 60R with the seam 78. In the illustrated embodiment, a dimension L3 in an up and down direction at the rear end 36c of the rear pocket 36 (i.e., an opening width of the rear pocket 36) and a dimension L4 in a front and rear direction (i.e., depth) of the rear pocket 36 are sized to the head of an out-of-position passenger. More particularly, the opening width L3 of the rear pocket 36 is set within a range of about 250 to 300 mm, while the depth L4 of the rear pocket 36 is about 140 mm. Further, the peripheral seam 78 is so configured that an inclination angle θ2 (FIG. 6) of an upper edge 78a/lower edge 78b from front edge 78c is within a range of about 90° to 110°, in a similar fashion to the bottom pocket 34.

In the illustrated embodiment, the bag body 16 internally includes three tethers as shown in FIGS. 3 to 5, namely, a front-rear tether 38 which connects a vicinity of the gas inlet port 24 and the passenger-side wall 29 and two transverse tethers 45 and 46 each of which connects the left side wall 21 and right side wall 22 of the circumferential wall 18.

The front-rear tether 38 is made of a flexible sheet material and located inside the bag body 16 along a front and rear direction for holding the front end 30a of the recessed region 30 in order to prevent the passenger-side wall 29 from protruding rearward at airbag deployment. More specifically, as shown in FIGS. 3 and 4, the front-rear tether 38 of this embodiment includes a front section 39 deployable towards the circumferential wall 18 and a rear section 43 deployable towards the passenger-side wall 29.

The front section 39 is formed by folding a material 70 shown in FIG. 6 and is deployable into such a three-dimensional contour similar to a generally triangular pyramid that extends generally along a left and right direction at the front end and extends generally along an up and down direction at the rear end, in a bilaterally symmetrical fashion with respect to the gas inlet port 24, as shown in FIG. 4. As shown in FIG. 6, in the illustrated embodiment, the front section 39 includes a joint region 40 which is a front end region of the front section 39 and a main body 41 disposed at the rear of the joint region 40. The joint region 40 has a generally semicircular front edge and is provided with openings (reference numerals omitted) corresponding to the gas inlet port 24 and mounting holes 25. The joint region 40 is sewn to the lower wall 20 of the bag body 16 at an entire peripheral area of the gas inlet port 24. More specifically, as shown in FIG. 3, the joint region 40 is sewn to the lower wall 20 with later-described reinforcing cloths 66 and 67 disposed between the joint region 40 and lower wall 20. The main body 41 extends rearward from the gas inlet port 24 and has such a three-dimensional outer contour similar to a generally triangular pyramid. More specifically, the main body 41 is open towards the downside and closed at the upper side, and is sewn to the front end 43a of the rear section 43 (FIGS. 3 to 5).

The rear section 43 has a sheet shape and is composed of the extended regions 60L and 60R extending in an integrated fashion from the inner edges 59a of the inner left panel 59L and inner right panel 59R for forming the passenger-side wall 29, as shown in FIGS. 3 and 6. In other words, the rear section 43 has a two-ply configuration and is joined to the front end 30a of the recessed region 30 of the passenger-side wall 29 by the rear end 43b due to an integral configuration with the inner left panel 59L and inner right panel 59R. As described above, part of the extended regions 60L and 60R, i.e., the rear pocket constituent regions 61L and 61R, forms the rear pocket 36. More specifically, the rear pocket constituent regions 61L/61R is a central region in an up and down direction in a rear region of each of the extended regions 60L and 60R. The rear section 43 of the front-rear tether 38 is composed of peripheral regions 62L and 62R of the extended regions 60L and 60R surrounding the rear pocket constituent regions 61L and 61R.

Each of the transverse tethers 45 and 46 is disposed generally along a left and right direction and connects the left side wall 21 and right side wall 22 together at airbag deployment. In this specific embodiment, the transverse tethers 45 and 46 are located above and below the front-rear tether 38 inside the bag body 16 as shown in FIG. 3.

In the illustrated embodiment, the transverse tethers 45 and 46 are disposed one above the other inside the bag body 16 in such a manner as to sandwich the front-rear tether 38 there between. Each of the transverse tethers 45 and 46 is formed into a generally band extending generally along a left and right direction and is so disposed that the width direction extends generally along a front and rear direction at airbag deployment. Each of the transverse tethers 45 and 46 is formed by jointing a pair of base cloths 45a and 45b/46a and 46b together, as shown in FIGS. 5 and 6. As shown in FIG. 3, the transverse tether 46 located on the lower side is deployable in an area between the bottom pocket 34 and rear pocket 36 and at a farther rearward position than the transverse tether 45. In the illustrated embodiment, lengths and widths of the transverse tethers 45 and 46 are generally identical. The transverse tethers 45 and 46 limit a clearance between the left side wall 21 and right side wall 22 and prevent the bag body 16 from inflating in such a manner that the left side wall 21 and right side wall 22 are separated too much in an initial stage of airbag deployment, The bag body 16 is formed by sewing together circumferential edges of base cloths cut in predetermined shapes in advance. As shown in FIG. 6, the bag body 16 of this specific embodiment is composed of the outer left panel 50L, outer right panel 50R, inner left panel 59L, inner right panel 59R, reinforcing cloths 66, 67 for reinforcing the periphery of the gas inlet port 24 and a protection cloth 68 for protecting the periphery of the gas inlet port 24 from an inflation gas.

The outer left panel 50L and the outer right panel 50R mainly constitute the circumferential wall 18 and regions of the passenger-side wall 29 on the outside in a left and right direction of the tops 31a of the raised regions 31L and 31R, and each of the panels 50L and 50R forms the left region/right region of those regions. The outer left panel 50L and the outer right panel 50R are formed into bilaterally symmetric, sectorial contours. That is, the outer left panel 50L and the outer right panel 50R serve as lower panel sections forming the lower wall 20 of the circumferential wall 18.

More specifically, the outer left panel 50L includes a generally sectorial main section 51L for forming the left region of the upper wall 19 and left side wall 21, a lower section 53L extending rearward and downwardly from the rear lower end of the main section 51L in the shape of a generally band for forming the left region of the lower wall 20, a protruding section 52L protruding from the front lower end of the main section 51L for forming the peripheral area of the gas inlet port 24, and an extended section 54L extending downwardly from a vicinity of the lower edge 53a of the lower section 53L. In the illustrated embodiment, the extended section 54L is formed at a slightly farther forward positon than the rear end of the lower section 53L. A root region (i.e., a region towards the lower section 53L) of the extended section 54L is the bottom pocket constituent region 55L for forming the bottom pocket 34, while a leading end region of the extended section 54L facing away from the lower section 53L is a mounting section 56L to be attached to the front-rear tether 38.

In a similar fashion to the outer left panel 50L, the outer right panel 50R includes a main section 51R, a lower section 53R, a protruding section 52R and an extended section 54R extending downwardly from a vicinity of the lower edge 53a of the lower section 53R. A root region (i.e., a region towards the lower section 53R) of the extended section 54R is the bottom pocket constituent region 55R for forming the bottom pocket 34, while a leading end region of the extended section 54R facing away from the lower section 53R is a mounting section 56R to be attached to the front-rear tether 38.

The inner left panel 59L and inner right panel 59R constitute the region of the passenger-side wall 29 between the tops 31a of the raised regions 31L and 31R. More specifically, the panels 59L and 59R form the region of the bag body 16 ranging from a central region in a left and right direction of the upper wall 19 in the circumferential wall 18 to an area of the passenger-side wall 29 between the tops 31a of the raised regions 31L and 31R. The inner left panel 59L and inner right panel 59R are configured into a pair of bands each curving generally in a crescent shape such that each panel 59L/59R forms the left/right half of the above-described region split up at the leading end 30a of the recessed region 30. That is, the inner left panel 59L constitutes the region from the front end 30a of the recessed region 30 to the top 31a of the left raised region 31L whereas the inner right panel 59R constitutes the region from the front end 30a of the recessed region 30 to the top 31a of the right raised region 31R, as shown in FIG. 6. In the illustrated embodiment, each of the inner left panel 59L and the inner left panel 59R is provided, at the inner circumferential edge 59a, with the extended region 60L/60R that forms the rear section 43 of the front-rear tether 38. In the illustrated embodiment, the central region in an up and down direction in the rear region of each of the extended regions 60L and 60R serves as the rear pocket constituent region 61L/61R for forming the rear pocket 36, while the peripheral regions 62L and 62R of the extended regions 60L and 60R surrounding the rear pocket constituent regions 61L and 61R form the rear section 43 of the front-rear tether 38. Front end regions 63L and 63R of the peripheral regions 62L and 62R are to be joined to the front section 39. In a flattened state, the outer circumferential edge 59b of each of the inner left panel 59L and inner right panel 59R is identical in curved shape to the outer circumferential edge 51a of each of the main bodies 51L and 51R of the outer left panel 50L and outer right panel 50R.

The reinforcing cloths 66 and 67 for reinforcing the peripheral area of the gas inlet port 24 are formed into generally circular shapes having different diameters. The protection cloth 68 is disposed on an inner side of the reinforcing cloth 67 as shown in FIG. 3, and includes an extended region 68a extending farther forward than the gas inlet port 24. As shown in FIG. 3, the extended region 68a covers an inner side of a sewn seam (reference numeral omitted) disposed proximate to the gas inlet port 24 in the front edge region of the airbag 15 as deployed and protects the sewn seam from an inflation gas.

In this specific embodiment, the components of the bag body 16, i.e., the outer left panel 50L, outer right panel 50R, inner left panel 59L, inner right panel 59R, reinforcing cloths 66 and 67, protection cloth 68, materials 70 for forming the front-rear tether 38, base cloths 45a, 45b, 46a and 46b for forming the transverse tethers 45 and 46, are formed of a flexible woven fabric of polyester yarn, polyamide yarn or the like.

As shown in FIGS. 3 to 6, the bag body 16 is formed into a bag by sewing or joining corresponding edges of the outer left panel 50L, outer right panel 50R, inner left panel 59L and inner right panel 59R together with sewing threads. Specifically, the outer circumferential edge 51a of the main body 51L of the outer left panel 50L is joined with the outer circumferential edge 59b of the inner left panel 59L with the outer seam 74L. The lower end region of the outer circumferential edge 61a of the main body 51L is joined with the rear upper edge 53b of the lower section 53L of the outer left panel 50L. The front edge 51b of the main body 51L of the outer left panel 50L is doubled on the corner and sewn up, and a remaining region is joined with the upper edge 59c of the inner left panel 59L. The lower edge 53a of the lower section 53L of the outer left panel 50L is joined with the lower edge 53a of the lower section 53R of the outer left panel 50R with the lower seam 75. The extended sections 54L and 54R of the outer panels 50L and 50R are joined together with the peripheral seam 77 which is continuous with the lower seam 75, thus forming the bottom pocket 34. The rear edge 53c of the lower section 53L of the outer left panel 50L is joined to the lower edge 59d of the inner left panel 59L.

The outer circumferential edge 51a of the main body 61R of the outer right panel 50R is joined with the outer circumferential edge 59b of the inner right panel 59R with the outer seam 74R. The lower end region of the outer circumferential edge 51a of the main body 51R is joined with the rear upper edge 53b of the lower section 53R of the outer right panel 50R. The front edge 51b of the main body 51R of the outer right panel 50R is doubled on the corner and sewn up, and a remaining region is joined with the upper edge 59c of the inner right panel 59R. The rear edge 53c of the lower section 53R of the outer right panel 50R is joined to the lower edge 59*d* of the inner right panel 59R. The inner circumferential edge 59*a* of the inner left panel 59L is joined together with the inner circumferential edge 59*a* of the inner right panel 59R with the inner seam 73. The extended regions 60L and 60R of the inner left panel 59L and inner right panel 59R are joined together with the peripheral seam 78 which is continuous with the inner seam 73, thus forming the rear pocket 36. The mounting sections 56L and 56R of the extended sections 54L and 54R in the outer left and right panels 50L and 50R, the rear end 41*a* of the main body 41 of the front section 39 of the front-rear tether 38, and the front ends 63L and 63R of the extended regions 60L and 60R of the inner left and right panels 59L and 59R (i.e., the front end of the rear section 43 of the front-rear tether 38) are joined together with the joint 80 as shown in FIGS. 3 to 5, that is, the joint 80 joints the upper end 34*b* of the bottom pocket 34 and the front end 36*b* of the rear pocket 36 to the front-rear tether 38.

Mounting of the airbag device M for a front passenger seat on the vehicle V1 is now described. Firstly, the retainer 9 is housed inside the airbag 15, and the airbag 15 is folded up so as to be set in the case 6. Then a breakable wrapping sheet (not shown) is wrapped around the airbag 15 for keeping the folded-up configuration. Subsequently, the airbag 15 is placed on the bottom wall 6*a* of the case 6. Then the main body 8*a* of the inflator 8 is set in the case 6 from the underside of the bottom wall 6*a* such that the bolts 9*a* of the retainer 9 projecting downward out of the bottom wall 6*a* penetrate the flange 8*c* of the inflator 8. If then nuts 10 are used to fasten the bolts 9*a* of the retainer 9 projecting downward out of the flange 8*c* of the inflator 8, the airbag 15 and the inflator 8 are mounted on the case 6.

Thereafter, the circumferential wall 6*b* of the case 6 is attached to the joint wall 12*c* of the airbag cover 12 on the dashboard 1, which has been mounted on board, and the unillustrated bracket of the case 6 is secured to the vehicle body structure. Thus the airbag device M is mounted on the vehicle V1.

After the airbag device M for a front passenger seat is mounted on the vehicle V1, in the event of a frontal collision, the inflator 8 discharges an inflation gas from the gas discharge ports 8*b* to inflate the airbag 15. Then the airbag 15 pushes and opens the doors 12*a* and 12*b* of the airbag cover 12, protrudes out of the case 6 via an opening formed by the opening of the doors 12*a* and 12*b*, and is deployed upward and rearward in such a manner as to fill up a space between the top plane 2 of the dashboard 1 and the windshield 4, as shown in FIG. 9.

In the airbag device M of the illustrated embodiment, the airbag 15 includes, on the lower wall 20, the bottom pocket 34 which is recessed upward from the lower wall 20 in a continuous fashion with the lower wall 20. The upper end 34*b* or bottom region of the bottom pocket 34 is joined to the front-rear tether 38 which is disposed generally along a front and rear direction inside the airbag 15 and connects the passenger-side wall 29 and a vicinity of the gas inlet port 24. That is, while being joined to the front-rear tether 38 by the upper end 34*b* region, the bottom pocket 34 is deployable away, towards a front direction, from the passenger-side wall 29. With this configuration, when the airbag 15 is deployed in an instance where a small-sized passenger is seated close to the dashboard 1, the front and rear edges of the bottom pocket 34 will be allowed to bend smoothly, and the bottom pocket 34 will smoothly separate the left and right bottom pocket constituent regions 55L and 55R over a generally entire area in a front and reaction without being affected by the passenger-side wall 29 and open for receiving the out-of-position passenger.

Figure 7:
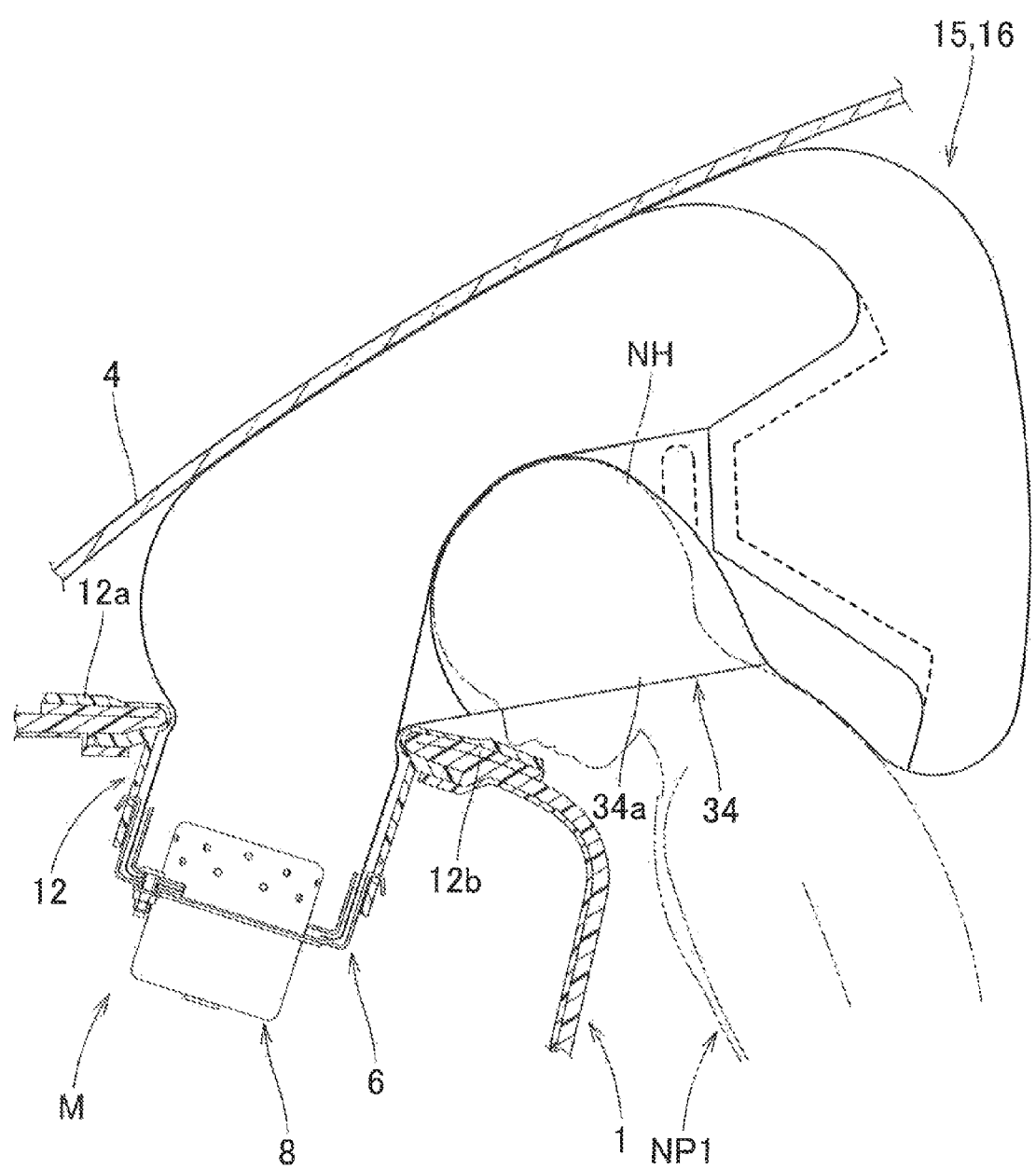
FIG. 7 is a schematic sectional view of the airbag device of FIG. 1 taken along a front and rear direction, showing the way the airbag is deployed when a passenger is seated out of position.

More specifically, supposing that the airbag device M is actuated when a small-sized passenger NP1 like an infant leans against the dashboard 1 and his head NH is in proximity to the dashboard 1 as shown in FIG. 7, the bag body 16 will be deployed rearward passing through a space between the head NH and windshield 4. Since the bottom pocket 34 of the airbag 15 is separated from the passenger-side wall 29, the bottom pocket 34 will open from the opening 34*a* (i.e., from the lower end 34*c*) and separate the left and right bottom pocket constituent regions 55L and 55R over a generally entire area in a front and rear direction, thus receiving the head NH of the small-sized out-of-position passenger NP1 inside smoothly. Accordingly, the airbag 15 of the embodiment will not give a strong pressing force to the head NH of the small-sized out-of-position passenger NP1 at deployment.

Moreover, when a passenger MP1 or MP2 seated at a normal position is thrown against the passenger-side wall 29 and presses the passenger-side wall 29 forward at a frontal collision of the vehicle V1 in the event of a frontal collision of a vehicle, the bottom pocket 34 will be hardly affected by the forward movement of the passenger-side wall 29 and stay closed since the bottom pocket 34 is disposed away from the passenger-side wall 29 and pulled forward by the front-rear tether 38. As a consequence, the airbag 15 of the airbag device M will smoothly cushion the passenger MP1 or MP2 seated at a normal position with regions of the passenger-side wall 29 on the left and right of the front-rear tether 38 (i.e., with the raised regions 31L and 31R), and cushion the passenger MP1 or MP2 with the passenger-side wall 29 having a sufficient reaction force since the bottom pocket 34 is configured not to be deformed.

Therefore, with the airbag device M for a front passenger seat of the foregoing embodiment, the airbag 15 is capable of protecting the passenger MP1 or MP2 seated at a normal position in an adequate fashion and does not give an undue pressure to the out-of-position passenger NP1 seated in proximity to the dashboard 1.

Moreover, in the airbag device M, the airbag 15 includes the front-rear tether 38 that connects the passenger-side wall 29 and a vicinity of the gas inlet port 24 inside the airbag 15 for preventing the passenger-side wall 29 from protruding rearward at airbag deployment. At airbag deployment, the front-rear tether 38 will prevent the airbag 15 from oscillating in a front and rear direction as well as prevent the passenger-side wall 29 from protruding unduly rearward, thus help deploy the airbag quickly.

Figure 8:
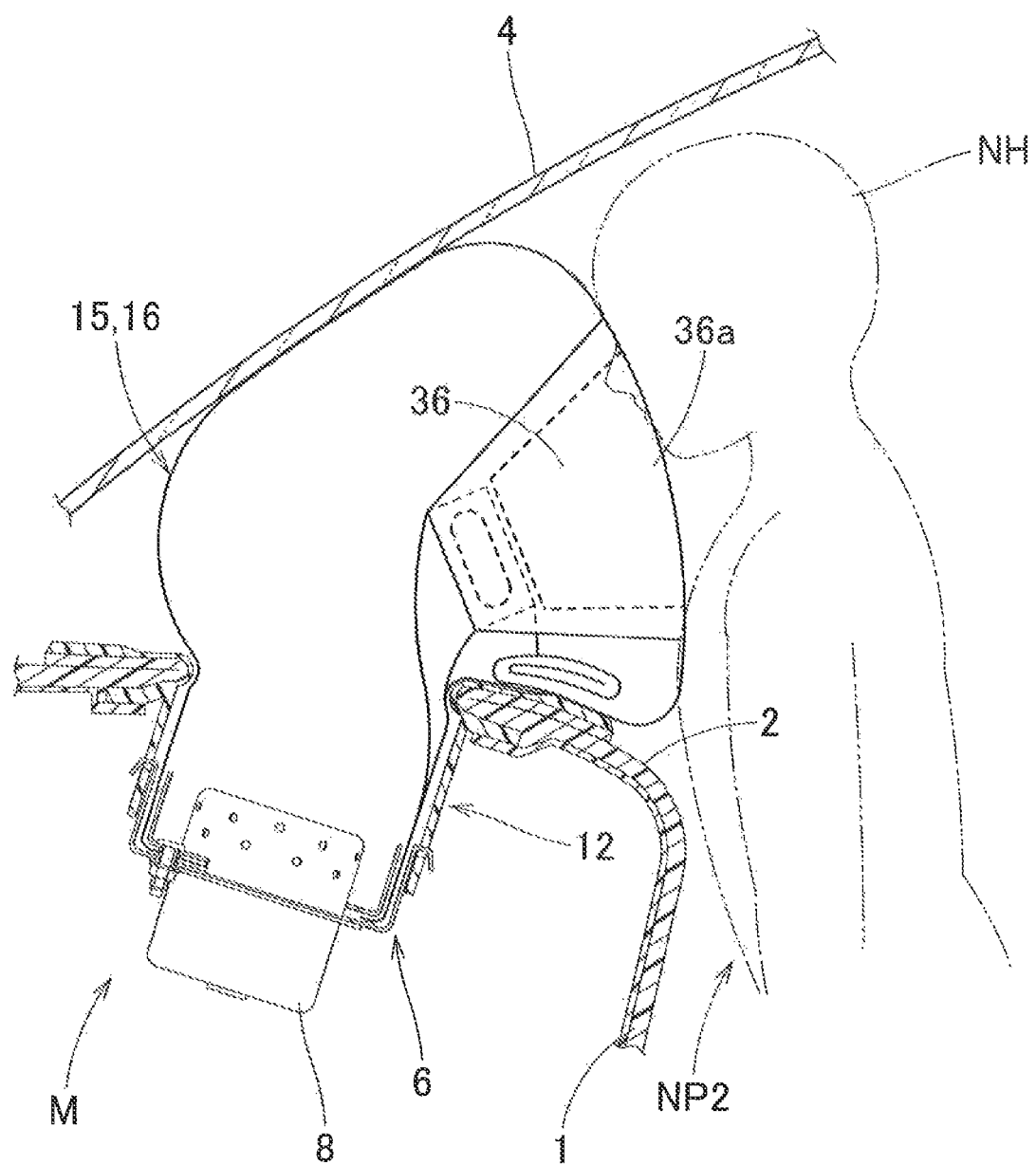
FIG. 8 is a schematic sectional view of the airbag device showing the way an airbag is deployed when a passenger is seated out of position.

Further, the airbag 15 includes the rear pocket 36 that is recessed forward from the passenger-side wall 29 in a continuous fashion with the passenger-side wall 29. In such an event that a small-sized out-of-position passenger NP2 like an infant is in contact with the windshield 4 by the head NH and in contact with the dashboard 1 by the abdomen NB as shown in FIG. 8, by way of example, the bag body 16 of the airbag 15 will be deployed in such a manner as to press the passenger NP2 rearward while unfurling in a left and right direction. However, the rear pocket 36 will be deployed proximate to the head NH of the small-sized out-of-position passenger NP2, and open from the opening 36*a* (i.e., from the rear end 36*c*) and separate the left and right rear pocket constituent regions 61L and 61R over a generally entire area in an up and down direction, thus receiving the head NH of the small-sized out-of-position passenger NP2 inside smoothly. If a vicinity of the jaw of the small-sized out-ofposition passenger NP2 is located close to the rear pocket 36 as shown in FIG. 8, the rear pocket 36 will also prevent the jaw from being pulled forcefully by the airbag 15 at deployment by receiving the jaw region there inside. That is, the airbag 15 of the embodiment will not give a strong pressing force to the head NH of the small-sized out-of-position passenger NP2 at deployment even in the event that the small-sized out-of-position passenger NP is standing close to the dashboard 1. If such an advantageous effect does not have to be considered, the airbag may be configured without a rear pocket and to include the bottom pocket only.

The front end 36b of the rear pocket 36 is connected to the front-rear tether 38 so as to be pulled forward by the front-rear tether 38 at airbag deployment. That is, the rear pocket 36 will be deployed in such a manner that the rear pocket constituent regions 61L and 61R stay attached to each other and the opening 36a at the rear end 36c is closed. Accordingly, the airbag 15 will smoothly cushion the passenger MP1 or MP2 seated at a normal position as well. More specifically, when a passenger MP1 of relatively large build like an adult male is seated at a normal position (an in-position), the airbag 15 will be deployed such that an area of the passenger-side wall 29 above the rear pocket 36 faces head-on the head MH1 of the passenger MP1, as shown in FIG. 9. Since the airbag 15 will then receive the head MH1 with the upper area of the rear pocket 36, the rear pocket 36 will be kept pulled forward by the front-rear tether 38 and kept from being deformed and therefore, the airbag 15 will keep the reaction force required to cushion the passenger MP1 of large build and receive the passenger MP1 in an adequate fashion. If the airbag 15 is deployed when a relatively small-sized passenger MP2 like an adult female is seated at a normal position, the head MH2 of the passenger MP2 will be received by an area of the passenger-side wall 29 around the rear pocket 36, as indicated by double-dotted lines in FIG. 9. In this instance, the rear pocket 36 will open from the opening 36a (i,e., from the rear end 36c) and separate the left and right rear pocket constituent regions 61L and 61R over a generally entire area in an up and down direction, thus receiving the head NH2 of the passenger MP2 inside smoothly. This will allow such a deployment behavior of the airbag 15 that the raised regions 31L and 31R protruding rearward on the left and right of the rear pocket 36 restrain the shoulders of the passenger MPG while the rear pocket 36 receives the head NH of the passenger MPG, such that the airbag 15 will cushion the head NH of the relatively small-sized passenger MPG softly with a reduced reaction force.

Furthermore, in the airbag device M of the foregoing embodiment, the lower wall 20 of the airbag 15 is composed of a pair of lower panel sections (i.e., the outer left panel 50L and outer right panel 50R) each of which is configured to form left and right half regions of the lower wall 20, and each of the bottom pocket constituent regions 55L and 55R forming the bottom pocket 34 extends from each of the outer left panel 50L and outer right panel 50R. With this configuration, the bottom pocket 34 continuing from the lower wall 20 will be formed easily during the production process of the airbag 15 by joining the circumferential edges of the bottom pocket constituent regions 55L and 55R with the seam 77 at the same time as joining the lower edges 53a of the lower sections 53L and 53R of the outer left panel 50L and outer right panel 50R. If such an advantageous effect does not have to be considered, the bottom pocket constituent regions may be composed of members separate from the components for forming the bag body.

In the airbag device M of the foregoing embodiment, moreover, the passenger-side wall 29 is composed of the inner left panel 59L and the inner right panel 59R each forming left and right half regions of the passenger-side wall 29, and each of the rear pocket constituent regions 61L and 61R forming the rear pocket 36 is composed of a part of the rear section 43 of the front-rear tether 38 extending from each of the inner left panel 59L and inner right panel 59R. With this configuration, the rear pocket 36 continuing from the passenger-side wall 29 will be formed easily during the production process of the airbag 15 by joining the circumferential edges of the rear pocket constituent regions 61L and 61R with the seam 78 at the same time as joining the inner circumferential edges 59a of the inner left panel 59L and inner right panel 59R. If such an advantageous effect does not have to be considered, the rear pocket constituent regions may be provided separate from the rear section of the front-rear tether.

An alternative embodiment is now described. An airbag 85 depicted in FIGS. 10 and 11 includes, on an upper wall 19A of a circumferential wall 18A deployable on the upper side of the airbag 85, an upper pocket 88 recessed downward in a continuous fashion with the upper wall 19A. The airbag 85 has a similar configuration to the airbag 15 except in that the bag body 86 includes the upper pocket 88 and does not include a transverse tether. Therefore, common members will be assigned "A" at the end of their common reference numerals and detailed descriptions of those members will be omitted.

Figure 10:
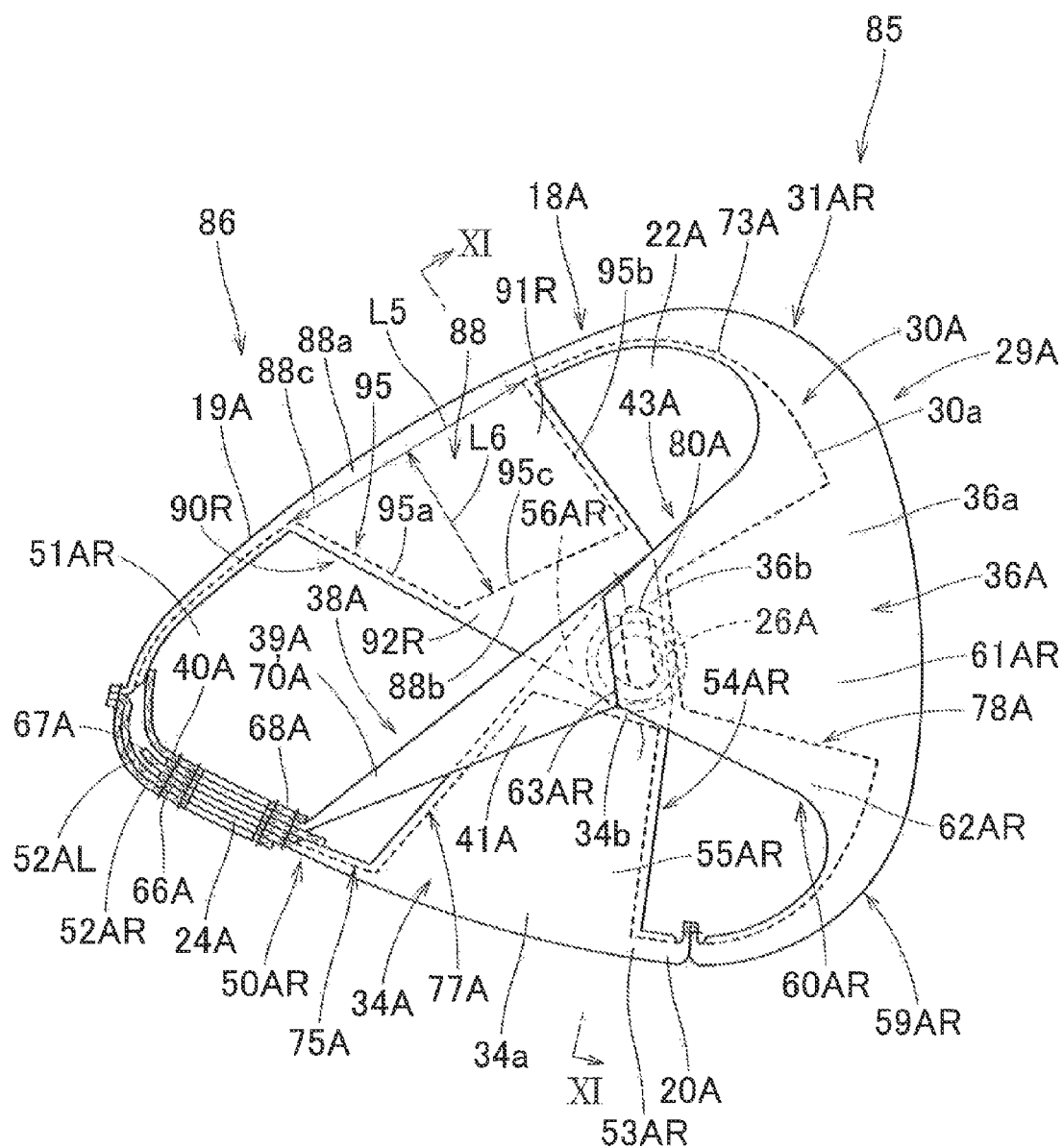
FIG. 10 is a sectional view of a modification of the airbag as inflated by itself, taken along a front and rear direction.
Figure 11:
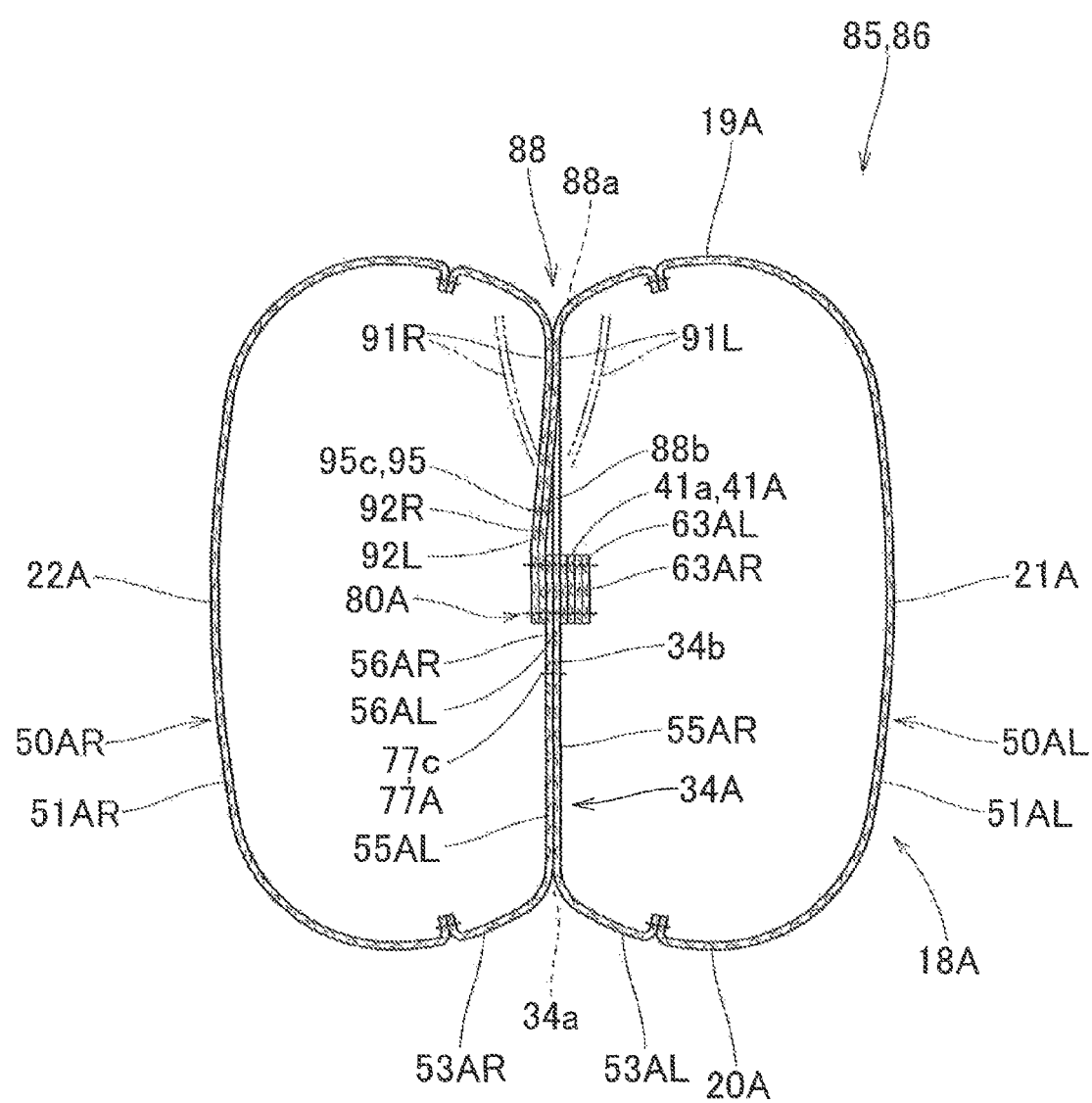
FIG. 11 is a sectional view of the airbag of FIG. 10 as inflated by itself, taken along line XI-XI of FIG. 10.
Figure 12:
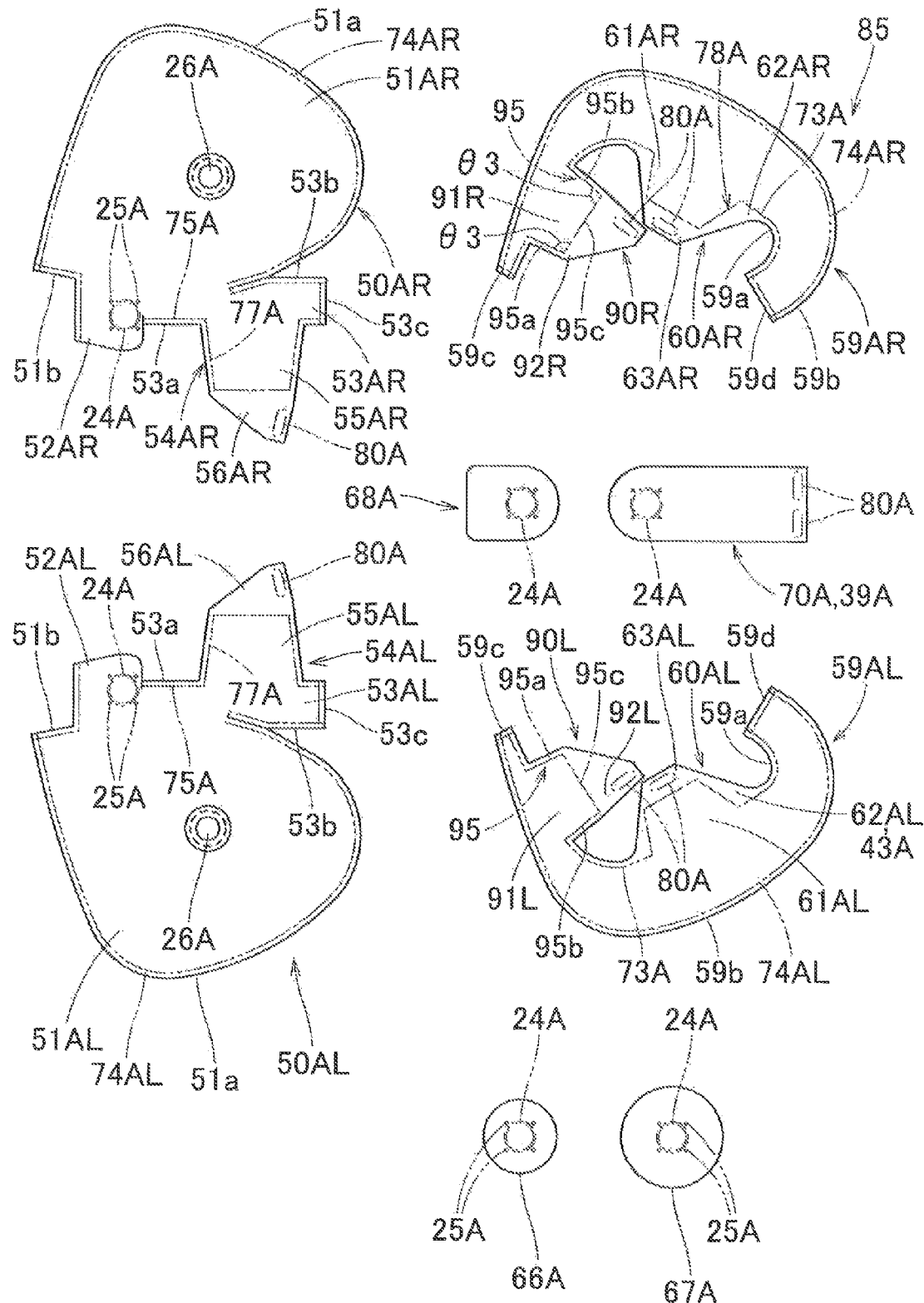
FIG. 12 depicts base cloths of the airbag of FIG. 10 by plan views.

The upper pocket 88 is recessed downward from the upper wall 19A in a continuous fashion with the upper wall 19A. More specifically, the upper pocket 88 is formed into a pouch-like contour having an opening at the upper end 88c by joining outer circumferential edges of a pair of upper pocket constituent regions 91L and 91R which extend from the upper wall 19A and are opposed in a left and right direction. The upper pocket 88 is disposed generally along a front and rear direction at a generally center in a left and right direction and in a vicinity of the center in a front and rear direction of the upper wall 19A. More particularly, each of the upper pocket constituent regions 91L and 91R is formed into a generally trapezoid slightly tapering towards the leading end (lower end) 88b. By joining (sewing) together the outer circumferential edges of the upper pocket constituent regions 91L and 91R with a peripheral seam 95, the upper pocket 88 is formed into a generally trapezoid tapering toward the lower end 88b. In the illustrated embodiment, a dimension La in a front and rear direction of the upper end 88c of the upper pocket 88 (i.e., an opening width of the upper pocket 88), see FIG. 10, and a dimension La in an up and down direction (i.e., depth) of the upper pocket 88 are sized to a head of an out-of-position passenger. More specifically, the opening width La of the upper pocket 88 is set within a range of about 250 to 300 mm, while the depth La of the upper pocket 88 is set within a range of about 150 to 200 mm. Further, the peripheral seam 95, which joins the outer circumferential edges of the upper pocket constituent regions 91L and 91R together, is so configured that an inclination angle θ3 (FIG. 12) of a front edge 95a/rear edge 95b from a lower edge 95c is within a range of about 90° to 110°, in a similar fashion to the bottom pocket 34 and rear pocket 36 described above. The lower end 88b region of the upper pocket 88 is connected to a front-rear tether 38A, As shown in FIG. 12, each of the upper pocket constituent regions 91L and 91R forming the upper pocket 88 is composed of an extended region 90L/90R which protrudes out of an upper region of the inner circumferential edge 59a of an inner left panel 59AL/an inner right panel 59AR forming the bag body 86. A root region (i.e., a region towards the inner left panel 59AL/inner right panel 59AR) of each of the extended regions 90L and 90R is the upper pocket constituent region 91L/91R for forming the upper pocket 88, while a leading end region of the extended region 90L/90R facing away from the inner left panel 59AL/inner right panel 59AR is a mounting section 92L/92R to be attached to the front-rear tether 38A. The peripheral seam 95 joining the extended regions 90L and 90R is continuous with an inner seam 73A joining the inner circumferential edges 59a of the inner left panel 59AL and inner right panel 59AR. In a similar fashion to the airbag 15 in the foregoing embodiment, the mounting sections 92L and 92R of the extended regions 90L and 90R, the rear end 41a of the main body 41A of the front section 39A of the front-rear tether 38A, the mounting sections 56AL and 56AR of the bottom pocket 34A, and the front ends 63AL and 63AR of the extended regions 60AL and 60AR of the inner left and right panels 59AL and 59AR (i.e., the front end of the rear section 43A of the front-rear tether 38A) are joined together with a joint 80A as shown in FIGS. 10 to 12. That is, the joint 80A joints the lower end 88b region of the upper pocket 88 to the front-rear tether 38A, together with the bottom pocket 34 and rear pocket 36. Each of the inner left panel 59AL and inner right panel 59AR has a similar configuration to the inner left panel 59L/inner right panel 59R of the airbag 15 except in having the extended region 90L/90R. Therefore, common regions will be assigned "A" at the end of their common reference numerals and detailed descriptions of those regions will be omitted. Further, as shown in FIGS. 10 to 12, the bag body 86 of the airbag 85 is formed by joining (sewing) circumferential edges of the outer left panel 50AL, outer right panel 50AR, inner left panel 59AL and inner right panel 59AR together with sewing threads, in a similar fashion to the bag body 16 of the airbag 15 in the foregoing embodiment.

Figure 13:
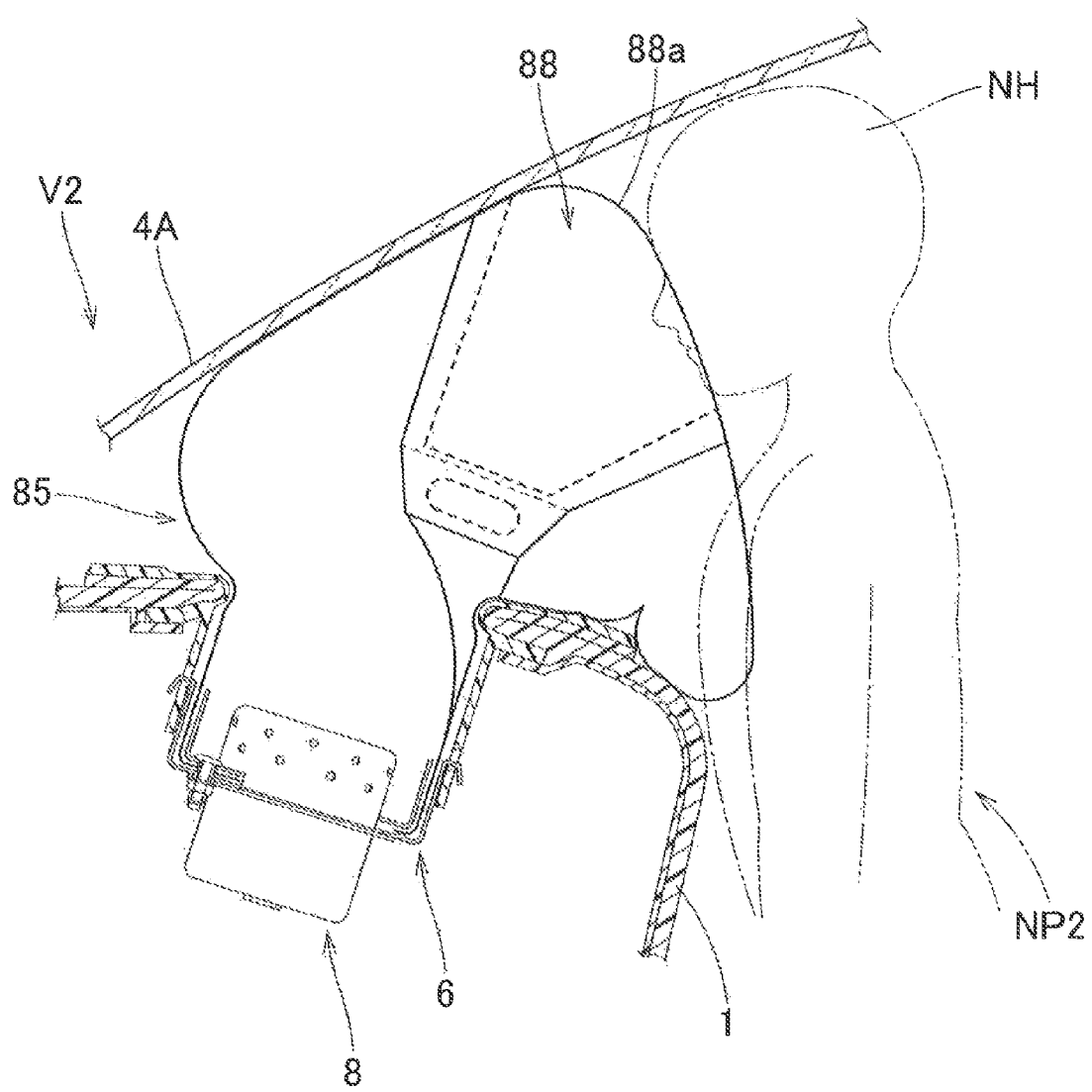
FIG. 13 is a schematic sectional view of an airbag device for a front passenger seat provided with the airbag of FIG. 10 taken along a front and rear direction, showing the way the airbag is deployed when a passenger is seated out of position.
Figure 14:
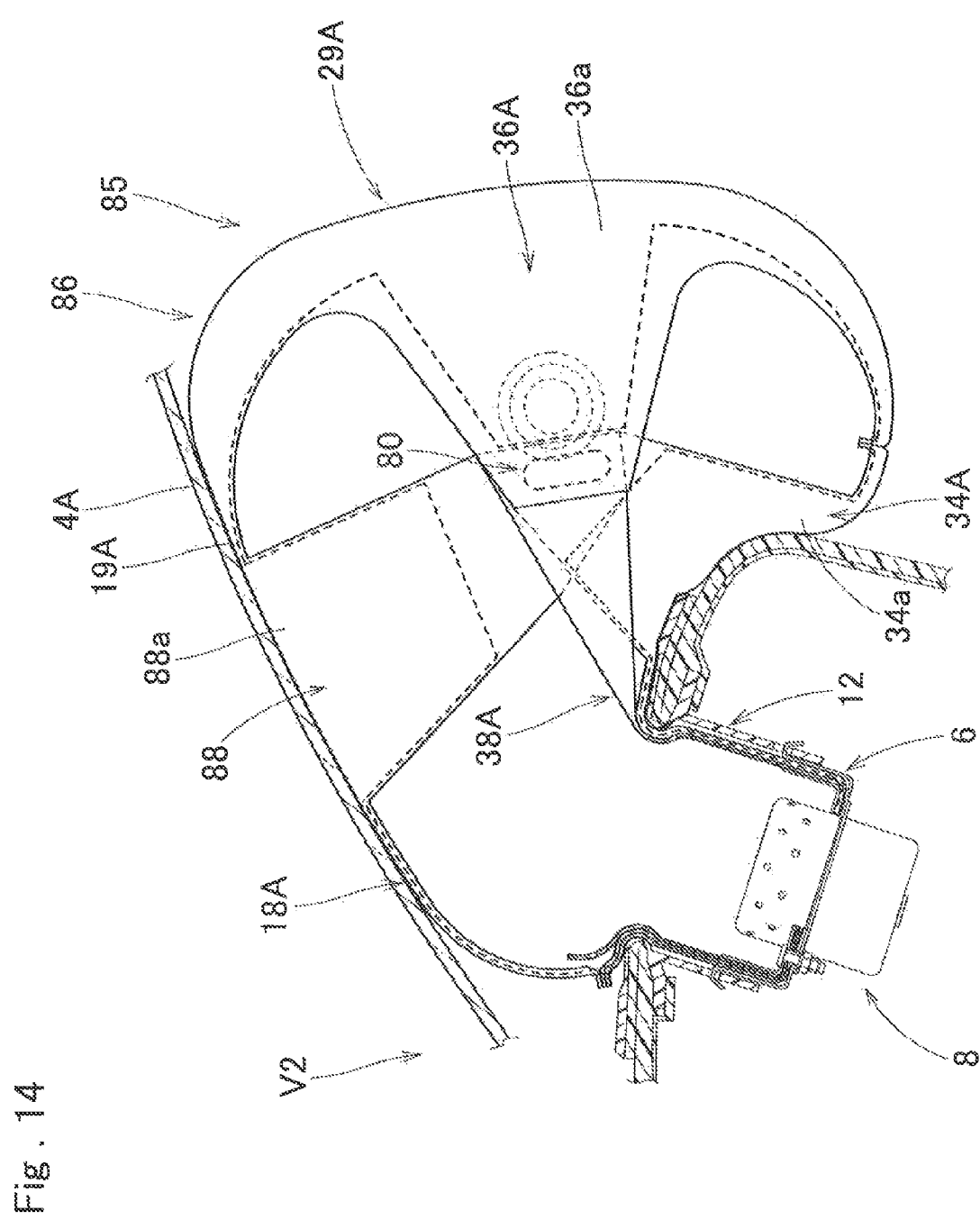
FIG. 14 is a sectional view of the airbag device of FIG. 13 taken along a front and rear direction as the airbag is fully deployed.

If an airbag device for a front passenger seat including the airbag 85 is mounted on a vehicle VD in which an inclination angle of the windshield 4A from a horizontal direction is smaller than in the vehicle Vs. Described above, by way of example, and the airbag device is actuated when a small-sized out-of-position passenger NP2 like an infant is in contact with the windshield 4A by the head NH and in contact with the dashboard 1 by the abdomen NB as shown in FIG. 13, by way of example, the bag body 86 will hit the windshield 4A and then be deployed rearward and downwardly while unfurling in a left and right direction. At this time, the upper pocket 88 will open from the opening 88a (i.e., from the upper end 88c) and separate the left and right upper pocket constituent regions 90L and 90R over a generally entire area in a front and rear direction, thus receiving the head NH of the small-sized out-of-position passenger NP2 inside smoothly. If a vicinity of the jaw of the small-sized out-of-position passenger NP2 is located close to the upper pocket 88 as shown in FIG. 13, the upper pocket 88 will also prevent the jaw from being pulled forcefully by the airbag 85 at deployment by receiving the jaw region there inside. That is, the airbag 85 will not give a strong pressing force to the head NH of the small-sized out-of-position passenger NP2 at deployment.

With the airbag device for a front passenger seat including the airbag 85, the airbag 85 will be deployed in such a manner as to bring the upper wall 19A on which the upper pocket 88 is located into contact with the windshield 4A. At this time, the region around the upper pocket 88 is unfolded to left and right sides in an opening fashion, and therefore will not press the windshield 4A forcefully. That is, it is expected that the airbag 85 does not press the windshield 4A forcefully in a wide area when it is deployed in a normal situation in the event of a frontal collision. Further, the airbag 85 will be quickly unfolded in a left and right direction.

What is claimed is:

1. An airbag device for a front passenger seat adapted to be mounted on an instrument panel disposed in front of the front passenger seat of a vehicle, the airbag device comprising a housing adapted to be disposed on a top plane of the instrument panel and an airbag which is housed in the housing in a folded-up configuration and inflatable with an inflation gas, the airbag comprising:
   a passenger-side wall deployable generally vertically at a rear region of the airbag in such a manner as to face the front passenger seat;
   a circumferential wall configured to extend forward from a peripheral edge of the passenger-side wall in a tapering fashion, the circumferential wall including a lower wall that is deployable on a lower region of the circumferential wall;
   a gas inlet port disposed generally at a center in a left and right direction in a vicinity of a front end of the airbag as deployed for taking in the inflation gas;
   a bottom pocket that is recessed upward from the lower wall of the circumferential wall in a pouch in such a manner as to be continuous with the lower wall and have an opening at a lower end of the bottom pocket on the lower wall, the bottom pocket being formed by joining outer circumferential edges of a pair of bottom pocket constituent regions that extend from the lower wall at left and right peripheries of the opening of the bottom pocket; and
   a tether that is disposed generally along a front and rear direction inside the airbag, the tether connecting the passenger-side wall and a vicinity of the gas inlet port for preventing the passenger-side wall from protruding rearward at airbag deployment, the tether being connected to an upper end region, i.e., a bottom region, of the bottom pocket,
   wherein:
   the lower wall of the airbag is composed of a pair of lower panel sections each of which is configured to form a left or right half region of the lower wall; and
   each of the bottom pocket constituent regions extends from each of the lower panel sections,
   each of the bottom pocket constituent regions is formed to protrude partially from the lower panel sections;
   the bottom pocket is formed into a pocket by joining together the outer circumferential edges of the pocket constituent regions with a first joint section, and the first joint section is continuous with a second joint section that joins the edges of the lower panel sections.

2. The airbag device for a front passenger seat of claim 1, further comprising a rear pocket that is recessed forward from the passenger-side wall in a pouch in such a manner as to be continuous with the passenger-side wall and have an opening at a rear end of the rear pocket on the passenger-side wall, the rear pocket being formed by joining outer circumferential edges of a pair of rear pocket constituent regions that extend from the passenger-side wall at left and right peripheries of the opening of the rear pocket, wherein a front end region, i.e., a bottom region, of the rear pocket being connected to the tether.

3. The airbag device for a front passenger seat of claim 1, further comprising an upper pocket that is disposed on an upper wall of the circumferential wall which is deployable on an upper side of the circumferential wall, the upper pocket being recessed downward from the upper wall in a pouch in such a manner as to be continuous with the upper wall and have an opening at an upper end of the upper pocket on the upper wall, the upper pocket being formed by joining outer circumferential edges of a pair of upper pocket constituent regions that extend from the upper wall at left and right peripheries of the opening of the upper pocket, wherein a lower end region, i.e., a bottom region, of the upper pocket being connected to the tether.

4. The airbag device for a front passenger seat of claim 2, wherein:
the passenger-side wall of the airbag is composed of an inner left panel forming a left half region of the passenger-side wall and an inner right panel forming a right half region of the passenger-side wall; and
each of the rear pocket constituent regions extends from each of the inner left panel and inner right panel.

5. The airbag device for a front passenger seat of claim 2, further comprising an upper pocket that is disposed on an upper wall of the circumferential wall which is deployable on an upper side of the circumferential wall, the upper pocket being recessed downward from the upper wall in a pouch in such a manner as to be continuous with the upper wall and have an opening at an upper end of the upper pocket on the upper wall, the upper pocket being formed by joining outer circumferential edges of a pair of upper pocket constituent regions that each extend from the upper wall at left and right peripheries of the opening of the upper pocket, wherein a lower end region, i.e., a bottom region, of the upper pocket being connected to the tether.

6. The airbag device for a front passenger seat of claim 5, wherein:
a region of the airbag ranging from the upper wall to the passenger-side wall is composed of an inner left panel forming a left half region of said region and an inner right panel forming a right half region of said region; and
each of the rear pocket constituent regions and each of the upper pocket constituent regions extends from the inner left panel or inner right panel.

7. The airbag device for a front passenger seat of claim 1, wherein the bottom pocket is formed into a generally trapezoid tapering upwardly.

8. The airbag device for a front passenger seat of claim 2, wherein the rear pocket is formed into a generally trapezoid tapering forward.

9. The airbag device for a front passenger seat of claim 3, wherein the upper pocket is formed into a generally trapezoid tapering downwardly.

10. The airbag device for a front passenger seat of claim 7, wherein, in a peripheral seam which joins the outer circumferential edges of the bottom pocket constituent regions together, an inclination angle of each of a front region and a rear region of the peripheral seam from an upper region of the peripheral seam is within a range of 90° to 110°.

11. The airbag device for a front passenger seat of claim 8, wherein, in a peripheral seam which joins the outer circumferential edges of the rear pocket constituent regions together, an inclination angle of each of an upper region and a lower region of the peripheral seam from a front region of the peripheral seam is within a range of 90° to 110°.

12. The airbag device for a front passenger seat of claim 9, wherein, in a peripheral seam which joins the outer circumferential edges of the upper pocket constituent regions together, an inclination angle of each of a front region and a rear region of the peripheral seam from a lower region of the peripheral seam is within a range of 90° to 110°.

13. An airbag device for a front passenger seat adapted to be mounted on an instrument panel disposed in front of the front passenger seat of a vehicle, the airbag device comprising a housing adapted to be disposed on a top plane of the instrument panel and an airbag which is housed in the housing in a folded-up configuration and inflatable with an inflation gas, the airbag comprising:
a passenger-side wall deployable generally vertically at a rear region of the airbag in such a manner as to face the front passenger seat;
a circumferential wall configured to extend forward from a peripheral edge of the passenger-side wall in a tapering fashion, the circumferential wall including a lower wall that is deployable on a lower region of the circumferential wall;
a gas inlet port disposed generally at a center in a left and right direction in a vicinity of a front end of the airbag as deployed for taking in the inflation gas;
a bottom pocket that is recessed upward from the lower wall of the circumferential wall in a pouch in such a manner as to be continuous with the lower wall and have an opening at a lower end of the bottom pocket on the lower wall, the bottom pocket being formed by joining outer circumferential edges of a pair of bottom pocket constituent regions that extend from the lower wall at left and right peripheries of the opening of the bottom pocket; and
a tether that is disposed generally along a front and rear direction inside the airbag, the tether connecting the passenger-side wall and a vicinity of the gas inlet port for preventing the passenger-side wall from protruding rearward at airbag deployment, the tether being connected to an upper end region, i.e., a bottom region, of the bottom pocket,
further comprising a rear pocket that is recessed forward from the passenger-side wall in a pouch in such a manner as to be continuous with the passenger-side wall and have an opening at a rear end of the rear pocket on the passenger-side wall, the rear pocket being formed by joining outer circumferential edges of a pair of rear pocket constituent regions that extend from the passenger-side wall at left and right peripheries of the opening of the rear pocket, wherein a front end region, i.e., a bottom region, of the rear pocket being connected to the tether.

14. The airbag device for a front passenger seat of claim 13, wherein:
the passenger-side wall of the airbag is composed of an inner left panel forming a left half region of the passenger-side wall and an inner right panel forming a right half region of the passenger-side wall; and
each of the rear pocket constituent regions extends from each of the inner left panel and inner right panel.

15. The airbag device for a front passenger seat of claim 13, further comprising an upper pocket that is disposed on an upper wall of the circumferential wall which is deployable on an upper side of the circumferential wall, the upper pocket being recessed downward from the upper wall in a pouch in such a manner as to be continuous with the upper wall and have an opening at an upper end of the upper pocket on the upper wall, the upper pocket being formed by joining outer circumferential edges of a pair of upper pocket constituent regions that each extend from the upper wall at left and right peripheries of the opening of the upper pocket, wherein a lower end region, i.e., a bottom region, of the upper pocket being connected to the tether.

16. The airbag device for a front passenger seat of claim 15, wherein:
- a region of the airbag ranging from the upper wall to the passenger-side wall is composed of an inner left panel forming a left half region of said region and an inner right panel forming a right half region of said region; and
- each of the rear pocket constituent regions and each of the upper pocket constituent regions extends from the inner left panel or inner right panel.

17. The airbag device for a front passenger seat of claim 13, wherein the rear pocket is formed into a generally trapezoid tapering forward.

18. The airbag device for a front passenger seat of claim 17, wherein, in a peripheral seam which joins the outer circumferential edges of the rear pocket constituent regions together, an inclination angle of each of an upper region and a lower region of the peripheral seam from a front region of the peripheral seam is within a range of 90° to 110°.

19. An airbag device for a front passenger seat adapted to be mounted on an instrument panel disposed in front of the front passenger seat of a vehicle, the airbag device comprising a housing adapted to be disposed on a top plane of the instrument panel and an airbag which is housed in the housing in a folded-up configuration and inflatable with an inflation gas, the airbag comprising:
- a passenger-side wall deployable generally vertically at a rear region of the airbag in such a manner as to face the front passenger seat;
- a circumferential wall configured to extend forward from a peripheral edge of the passenger-side wall in a tapering fashion, the circumferential wall including a lower wall that is deployable on a lower region of the circumferential wall;
- a gas inlet port disposed generally at a center in a left and right direction in a vicinity of a front end of the airbag as deployed for taking in the inflation gas;
- a bottom pocket that is recessed upward from the lower wall of the circumferential wall in a pouch in such a manner as to be continuous with the lower wall and have an opening at a lower end of the bottom pocket on the lower wall, the bottom pocket being formed by joining outer circumferential edges of a pair of bottom pocket constituent regions that extend from the lower wall at left and right peripheries of the opening of the bottom pocket; and
- a tether that is disposed generally along a front and rear direction inside the airbag, the tether connecting the passenger-side wall and a vicinity of the gas inlet port for preventing the passenger-side wall from protruding rearward at airbag deployment, the tether being connected to an upper end region, i.e., a bottom region, of the bottom pocket,
- further comprising an upper pocket that is disposed on an upper wall of the circumferential wall which is deployable on an upper side of the circumferential wall, the upper pocket being recessed downward from the upper wall in a pouch in such a manner as to be continuous with the upper wall and have an opening at an upper end of the upper pocket on the upper wall, the upper pocket being formed by joining outer circumferential edges of a pair of upper pocket constituent regions that extend from the upper wall at left and right peripheries of the opening of the upper pocket, wherein a lower end region, i.e., a bottom region, of the upper pocket being connected to the tether.

20. The airbag device for a front passenger seat of claim 19, wherein the upper pocket is formed into a generally trapezoid tapering downwardly.

* * * * *